United States Patent
Radtke et al.

(10) Patent No.: US 9,015,624 B2
(45) Date of Patent: *Apr. 21, 2015

(54) FLOATING COMMAND OBJECT

(75) Inventors: Roland Radtke, Seattle, WA (US); Jesse Clay Satterfield, Seattle, WA (US); Jensen M. Harris, Kirkland, WA (US); Mark A. Peters, Seattle, WA (US); Deepak Menon, Redmond, WA (US); Mark R. Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 13/027,289

(22) Filed: Feb. 15, 2011

(65) Prior Publication Data

US 2011/0138273 A1 Jun. 9, 2011

Related U.S. Application Data

(63) Continuation of application No. 11/151,686, filed on Jun. 13, 2005, now Pat. No. 7,895,531.

(60) Provisional application No. 60/601,815, filed on Aug. 16, 2004.

(51) Int. Cl.
  *G06F 3/00* (2006.01)
  *G06F 17/24* (2006.01)
  *G06F 3/0481* (2013.01)

(52) U.S. Cl.
  CPC .............. *G06F 17/24* (2013.01); *G06F 3/0481* (2013.01)

(58) Field of Classification Search
  USPC .......................................... 715/705, 708, 711
  See application file for complete search history.

(56) References Cited

U.S. PATENT DOCUMENTS

| 4,823,283 A | 4/1989 | Diehm et al. ................. 715/825 |
| 5,155,806 A | 10/1992 | Hoeber et al. ................ 715/711 |

(Continued)

FOREIGN PATENT DOCUMENTS

| AU | 2005203411 | 3/2006 |
| AU | 2007255043 | 8/2012 |

(Continued)

OTHER PUBLICATIONS

Microsoft Office Word 2003. Part of Microsoft Office Professional Edition 2003. Copyright 1983-2003 Microsoft Corporation.*

(Continued)

*Primary Examiner* — Omar Abdul-Ali
(74) *Attorney, Agent, or Firm* — Steve Crocker; Jim Ross; Micky Minhas

(57) ABSTRACT

A floating command object is provided for offering a set of commonly or frequently used commands in close proximity to a selected text, data or other object in a document. When a given object is selected for editing, the floating object automatically displays near the object to allow easy selection of relevant commands such as formatting property commands. The object remains displayed to allow multiple command selections until it is closed by user action. If a mouse or touchpad pointer is moved away from the displayed object, the displayed object becomes increasingly translucent to visually deemphasize the relevance of the object to the new position of the pointer.

17 Claims, 10 Drawing Sheets

(56) References Cited

U.S. PATENT DOCUMENTS

| | | | |
|---|---|---|---|
| 5,220,675 A | 6/1993 | Padawer et al. | |
| 5,247,438 A | 9/1993 | Subas et al. | 700/90 |
| 5,305,435 A | 4/1994 | Bronson | |
| 5,323,314 A | 6/1994 | Baber et al. | 705/8 |
| 5,377,354 A | 12/1994 | Scannell et al. | 718/103 |
| 5,412,772 A | 5/1995 | Monson | |
| 5,457,476 A | 10/1995 | Jensen | |
| 5,461,708 A | 10/1995 | Kahn | |
| 5,500,936 A | 3/1996 | Allen et al. | 395/156 |
| 5,502,805 A | 3/1996 | Anderson et al. | |
| 5,519,606 A | 5/1996 | Frid-Nielsen et al. | 705/9 |
| 5,559,875 A | 9/1996 | Bieselin et al. | 379/202.01 |
| 5,559,944 A | 9/1996 | Ono | 715/841 |
| 5,570,109 A | 10/1996 | Jenson | 715/823 |
| 5,581,677 A | 12/1996 | Myers et al. | |
| 5,588,107 A | 12/1996 | Bowden et al. | 715/828 |
| 5,592,602 A | 1/1997 | Edmunds | |
| 5,596,694 A | 1/1997 | Capps | 345/473 |
| 5,625,783 A | 4/1997 | Ezekiel et al. | 395/352 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A | 7/1997 | Tuniman et al. | 715/810 |
| 5,659,693 A | 8/1997 | Hansen et al. | 715/779 |
| 5,664,127 A | 9/1997 | Anderson et al. | 715/209 |
| 5,664,208 A | 9/1997 | Pavley et al. | 715/209 |
| 5,673,403 A | 9/1997 | Brown et al. | 715/744 |
| 5,721,847 A | 2/1998 | Johnson | 715/786 |
| 5,734,915 A | 3/1998 | Roewer | 395/773 |
| 5,760,768 A | 6/1998 | Gram | 345/333 |
| 5,760,773 A * | 6/1998 | Berman et al. | 715/808 |
| 5,761,646 A | 6/1998 | Frid-Nielsen et al. | 705/9 |
| 5,764,960 A | 6/1998 | Perks et al. | |
| 5,778,402 A | 7/1998 | Gipson | 715/201 |
| 5,778,404 A | 7/1998 | Capps et al. | 715/531 |
| 5,787,295 A | 7/1998 | Nakao | 715/210 |
| 5,793,365 A | 8/1998 | Tang et al. | 715/758 |
| 5,796,393 A | 8/1998 | MacNaughton et al. | |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,844,588 A | 12/1998 | Anderson | |
| 5,855,006 A | 12/1998 | Huemoeller et al. | 705/9 |
| 5,864,848 A | 1/1999 | Horvitz et al. | |
| 5,872,973 A | 2/1999 | Mitchell et al. | |
| 5,873,108 A | 2/1999 | Goyal et al. | 715/203 |
| 5,874,953 A | 2/1999 | Webster et al. | |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,924,089 A | 7/1999 | Mocek et al. | |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,173 A | 12/1999 | Ubillos | |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,395 A | 3/2000 | Chow et al. | |
| 6,038,542 A | 3/2000 | Ruckdashel | 705/9 |
| 6,043,816 A | 3/2000 | Williams et al. | |
| 6,067,087 A | 5/2000 | Krauss et al. | 715/762 |
| 6,067,551 A | 5/2000 | Brown et al. | 1/1 |
| 6,072,492 A | 6/2000 | Schagen et al. | 715/733 |
| 6,073,110 A | 6/2000 | Rhodes et al. | |
| 6,073,142 A | 6/2000 | Geiger et al. | |
| 6,085,206 A | 7/2000 | Domini et al. | 707/533 |
| 6,088,707 A | 7/2000 | Bates et al. | |
| 6,092,103 A | 7/2000 | Pritsch | |
| 6,101,480 A | 8/2000 | Conmy et al. | 705/9 |
| 6,133,915 A | 10/2000 | Arcuri et al. | 715/779 |
| 6,154,755 A | 11/2000 | Dellert et al. | |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 715/210 |
| 6,195,094 B1 | 2/2001 | Celebiler | 715/764 |
| 6,199,102 B1 | 3/2001 | Cobb | |
| 6,211,879 B1 | 4/2001 | Soohoo | 715/854 |
| 6,216,122 B1 | 4/2001 | Elson | 707/5 |
| 6,219,670 B1 | 4/2001 | Mocek et al. | 707/102 |
| 6,222,540 B1 | 4/2001 | Sacerdoti | 345/581 |
| 6,232,971 B1 | 5/2001 | Haynes | 715/800 |
| 6,236,396 B1 | 5/2001 | Jenson et al. | 715/764 |
| 6,237,135 B1 | 5/2001 | Timbol | |
| 6,239,798 B1 | 5/2001 | Ludolph et al. | |
| 6,256,628 B1 | 7/2001 | Dobson et al. | 707/6 |
| 6,269,341 B1 | 7/2001 | Redcay, Jr. | 705/8 |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,307,574 B1 | 10/2001 | Ashe | |
| 6,311,195 B1 | 10/2001 | Hachiya et al. | |
| 6,313,854 B1 | 11/2001 | Gibson | |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,341,277 B1 | 1/2002 | Coden et al. | 707/718 |
| 6,353,451 B1 | 3/2002 | Teibel et al. | 715/803 |
| 6,359,634 B1 | 3/2002 | Cragun et al. | 715/777 |
| 6,373,507 B1 | 4/2002 | Camara et al. | 345/825 |
| 6,374,304 B1 | 4/2002 | Chiashi | |
| 6,384,849 B1 | 5/2002 | Morcos et al. | 715/810 |
| 6,385,769 B1 | 5/2002 | Lewallen | |
| 6,405,216 B1 | 6/2002 | Minnaert et al. | 707/104.1 |
| 6,424,829 B1 | 7/2002 | Kraft | 455/412.1 |
| 6,429,882 B1 | 8/2002 | Abdelnur et al. | 345/763 |
| 6,430,563 B1 | 8/2002 | Fritz et al. | 707/694 |
| 6,433,801 B1 | 8/2002 | Moon et al. | 345/840 |
| 6,433,831 B1 | 8/2002 | Dinnwiddie et al. | 348/553 |
| 6,434,598 B1 | 8/2002 | Gish | 709/203 |
| 6,442,527 B1 | 8/2002 | Worthington | 705/8 |
| 6,446,118 B1 | 9/2002 | Gottlieb | |
| 6,456,304 B1 | 9/2002 | Angiulo et al. | 345/779 |
| 6,457,062 B1 | 9/2002 | Pivowar et al. | 709/248 |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kineo et al. | 345/837 |
| 6,469,723 B1 | 10/2002 | Gould | |
| 6,480,865 B1 | 11/2002 | Lee et al. | 715/523 |
| 6,484,180 B1 | 11/2002 | Lyons et al. | 1/1 |
| 6,493,006 B1 | 12/2002 | Gourdol et al. | 715/825 |
| 6,493,007 B1 | 12/2002 | Pang | |
| 6,493,731 B1 | 12/2002 | Jones et al. | 715/234 |
| 6,507,845 B1 | 1/2003 | Cohen et al. | 707/608 |
| 6,546,417 B1 | 4/2003 | Baker | 709/206 |
| 6,567,509 B1 | 5/2003 | Gusler et al. | |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,584,501 B1 | 6/2003 | Cartsonis et al. | |
| 6,603,493 B1 | 8/2003 | Lovell et al. | |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,633,867 B1 | 10/2003 | Kraft et al. | |
| 6,635,089 B1 | 10/2003 | Burkett et al. | 715/513 |
| 6,654,791 B1 | 11/2003 | Bates et al. | |
| 6,664,983 B2 | 12/2003 | Ludolph | 715/775 |

(56) References Cited

U.S. PATENT DOCUMENTS

| | | | |
|---|---|---|---|
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/234 |
| 6,701,513 B1 | 3/2004 | Bailey | |
| 6,707,454 B1 | 3/2004 | Barg | |
| 6,708,205 B2 | 3/2004 | Sheldon et al. | 709/206 |
| 6,721,402 B2 | 4/2004 | Usami | |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,850 B2 | 6/2004 | O'Leary | |
| 6,750,890 B1 | 6/2004 | Sugimoto | 715/838 |
| 6,785,868 B1 | 8/2004 | Raff | 715/530 |
| 6,789,107 B1 | 9/2004 | Bates et al. | |
| 6,799,095 B1 | 9/2004 | Owen et al. | |
| 6,816,904 B1 | 11/2004 | Ludwig et al. | |
| 6,825,859 B1 | 11/2004 | Severenuk et al. | 345/764 |
| 6,826,729 B1 | 11/2004 | Giesen et al. | 715/837 |
| 6,832,244 B1 | 12/2004 | Raghunandan | |
| 6,850,255 B2 | 2/2005 | Muschetto | 715/788 |
| 6,871,195 B2 * | 3/2005 | Ryan et al. | 706/46 |
| 6,882,353 B2 * | 4/2005 | Nettles et al. | 715/764 |
| 6,882,354 B1 | 4/2005 | Nielsen | 715/784 |
| 6,895,426 B1 | 5/2005 | Cortright et al. | |
| 6,904,449 B1 | 6/2005 | Quinones | 709/203 |
| 6,906,717 B2 | 6/2005 | Couckuyt et al. | 345/440 |
| 6,907,423 B2 | 6/2005 | Weil et al. | |
| 6,915,492 B2 | 7/2005 | Kurtenbach et al. | 715/810 |
| 6,924,797 B1 | 8/2005 | MacPhail | 345/326 |
| 6,925,605 B2 | 8/2005 | Bates et al. | 709/206 |
| 6,928,613 B1 | 8/2005 | Ishii | |
| 6,934,740 B1 | 8/2005 | Lawande et al. | |
| 6,941,304 B2 | 9/2005 | Gainey et al. | |
| 6,956,429 B1 | 10/2005 | Elbanhawy | |
| 6,964,025 B2 | 11/2005 | Angiulo | 715/838 |
| 6,981,209 B1 | 12/2005 | Parikh et al. | |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 6,990,652 B1 | 1/2006 | Parthasarathy et al. | |
| 6,990,654 B2 | 1/2006 | Carroll, Jr. | |
| 7,027,463 B2 | 4/2006 | Mathew et al. | |
| 7,032,210 B2 | 4/2006 | Alloing et al. | |
| 7,039,596 B1 | 5/2006 | Lu | 705/8 |
| 7,044,363 B2 | 5/2006 | Silverbrook et al. | |
| 7,046,848 B1 | 5/2006 | Olcott | 382/176 |
| 7,069,538 B1 | 6/2006 | Renshaw | |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,117,370 B2 | 10/2006 | Khan et al. | 713/186 |
| 7,134,095 B1 | 11/2006 | Smith et al. | |
| 7,149,983 B1 | 12/2006 | Robertson et al. | 715/810 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,317 B1 | 3/2007 | Hazel | 715/804 |
| 7,206,813 B2 | 4/2007 | Dunbar et al. | |
| 7,206,814 B2 | 4/2007 | Kirsch | |
| 7,212,208 B2 | 5/2007 | Khozai | 345/440 |
| 7,216,301 B2 | 5/2007 | Moehrle | 715/811 |
| 7,219,305 B2 | 5/2007 | Jennings | 715/761 |
| 7,240,323 B1 | 7/2007 | Desai et al. | 717/100 |
| 7,249,325 B1 | 7/2007 | Donaldson | 715/777 |
| 7,251,640 B2 | 7/2007 | Baumard | |
| 7,263,668 B1 | 8/2007 | Lentz | 715/801 |
| 7,290,033 B1 | 10/2007 | Goldman et al. | 709/206 |
| 7,296,241 B2 | 11/2007 | Oshiro et al. | |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,356,772 B2 | 4/2008 | Brownholtz et al. | 715/752 |
| 7,360,174 B2 | 4/2008 | Grossman et al. | 715/854 |
| 7,370,282 B2 | 5/2008 | Cary | |
| 7,386,535 B1 | 6/2008 | Kalucha et al. | |
| 7,386,835 B1 | 6/2008 | Desai et al. | 717/117 |
| 7,392,249 B1 | 6/2008 | Harris et al. | 707/5 |
| 7,395,221 B2 | 7/2008 | Doss et al. | 705/9 |
| 7,395,500 B2 | 7/2008 | Whittle et al. | |
| 7,421,660 B2 | 9/2008 | Charmock et al. | 715/751 |
| 7,421,690 B2 | 9/2008 | Forstall et al. | 709/206 |
| 7,426,713 B2 | 9/2008 | Duggan et al. | |
| 7,461,077 B1 | 12/2008 | Greenwood | |
| 7,464,343 B2 | 12/2008 | Shaw et al. | |
| 7,469,385 B2 | 12/2008 | Harper et al. | |
| 7,472,117 B2 | 12/2008 | Dettinger et al. | 1/1 |
| 7,484,213 B2 | 1/2009 | Mathew et al. | |
| 7,499,907 B2 | 3/2009 | Brown et al. | 1/1 |
| 7,505,954 B2 | 3/2009 | Heidloff et al. | 707/1 |
| 7,530,029 B2 | 5/2009 | Satterfield et al. | 715/779 |
| 7,555,707 B1 | 6/2009 | Labarge et al. | 715/234 |
| 7,567,964 B2 | 7/2009 | Brice et al. | 707/9 |
| 7,584,253 B2 | 9/2009 | Curbow et al. | |
| 7,627,561 B2 | 12/2009 | Pell et al. | 707/3 |
| 7,664,821 B1 | 2/2010 | Ancin et al. | 709/206 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 7,788,598 B2 | 8/2010 | Bansal et al. | 715/810 |
| 7,802,199 B2 | 9/2010 | Shneerson et al. | |
| 7,831,902 B2 | 11/2010 | Sourov et al. | 715/220 |
| 7,853,877 B2 | 12/2010 | Giesen et al. | 715/711 |
| 7,865,868 B2 | 1/2011 | Falzone Schaw et al. | |
| 7,870,465 B2 | 1/2011 | VerSteeg | 714/774 |
| 7,886,290 B2 | 2/2011 | Dhanjal et al. | 717/170 |
| 7,895,531 B2 | 2/2011 | Radtke et al. | 715/810 |
| 8,117,542 B2 | 2/2012 | Radtke et al. | |
| 8,146,016 B2 | 3/2012 | Himberger et al. | |
| 8,150,930 B2 | 4/2012 | Satterfield et al. | |
| 8,201,103 B2 | 6/2012 | Dukhon et al. | |
| 8,239,882 B2 | 8/2012 | Dhanjal et al. | |
| 8,255,828 B2 | 8/2012 | Harris et al. | |
| 8,402,096 B2 | 3/2013 | Affronti et al. | |
| 8,484,578 B2 | 7/2013 | Dukhon et al. | |
| 8,605,090 B2 | 12/2013 | Garg et al. | |
| 8,627,222 B2 | 1/2014 | Hartwell et al. | |
| 8,638,333 B2 | 1/2014 | Garg et al. | |
| 8,689,137 B2 | 4/2014 | McCormack et al. | |
| 8,762,880 B2 | 6/2014 | Dukhon et al. | |
| 8,799,808 B2 | 8/2014 | Satterfield et al. | |
| 8,839,139 B2 | 9/2014 | Leukart et al. | |
| 2001/0032220 A1 | 10/2001 | Van Hoff | 707/513 |
| 2001/0034762 A1 | 10/2001 | Jacobs et al. | |
| 2001/0035882 A1 | 11/2001 | Stoakley et al. | 715/779 |
| 2001/0038395 A1 | 11/2001 | Holtzblatt et al. | |
| 2001/0040627 A1 | 11/2001 | Obradovich | |
| 2001/0044736 A1 | 11/2001 | Jacobs et al. | |
| 2001/0044741 A1 | 11/2001 | Jacobs et al. | |
| 2001/0049677 A1 | 12/2001 | Talib et al. | 707/3 |
| 2002/0007380 A1 | 1/2002 | Bauchot et al. | 707/530 |
| 2002/0029247 A1 | 3/2002 | Kawamoto | 709/206 |
| 2002/0037754 A1 | 3/2002 | Hama et al. | 455/566 |
| 2002/0052721 A1 | 5/2002 | Ruff et al. | 703/1 |
| 2002/0052880 A1 | 5/2002 | Fruensgaard et al. | 707/104.1 |
| 2002/0052916 A1 | 5/2002 | Kloba et al. | |
| 2002/0054101 A1 | 5/2002 | Beatty | |
| 2002/0054128 A1 | 5/2002 | Lau et al. | |
| 2002/0063734 A1 | 5/2002 | Khalfay et al. | |
| 2002/0070977 A1 | 6/2002 | Morcos et al. | 345/810 |
| 2002/0073091 A1 | 6/2002 | Jain et al. | |
| 2002/0073156 A1 | 6/2002 | Newman | |
| 2002/0075330 A1 | 6/2002 | Rosenzweig et al. | 345/854 |
| 2002/0078143 A1 | 6/2002 | DeBoor et al. | 709/203 |
| 2002/0083054 A1 | 6/2002 | Peltonen et al. | 707/5 |
| 2002/0089543 A1 | 7/2002 | Ostergaard et al. | |
| 2002/0091697 A1 | 7/2002 | Huang et al. | 707/10 |
| 2002/0091739 A1 | 7/2002 | Ferlitsch | 707/526 |
| 2002/0097266 A1 | 7/2002 | Hachiya et al. | |
| 2002/0099775 A1 | 7/2002 | Gupta et al. | |

(56) References Cited

U.S. PATENT DOCUMENTS

| | | |
|---|---|---|
| 2002/0116508 A1 | 8/2002 | Khan |
| 2002/0122071 A1 | 9/2002 | Camara et al. ............... 715/810 |
| 2002/0123984 A1 | 9/2002 | Prakash |
| 2002/0129052 A1 | 9/2002 | Glazer et al. |
| 2002/0133557 A1 | 9/2002 | Winarski .................... 709/207 |
| 2002/0135621 A1 | 9/2002 | Angiulo et al. ............... 345/838 |
| 2002/0140731 A1 | 10/2002 | Subramaniam et al. ...... 345/762 |
| 2002/0140740 A1 | 10/2002 | Chen .......................... 715/810 |
| 2002/0149623 A1 | 10/2002 | West et al. ................... 345/765 |
| 2002/0149629 A1 | 10/2002 | Craycroft et al. ............. 345/861 |
| 2002/0154178 A1 | 10/2002 | Barnett et al. ................ 715/853 |
| 2002/0158876 A1 | 10/2002 | Janssen ........................ 345/504 |
| 2002/0163538 A1 | 11/2002 | Shteyn ........................ 345/752 |
| 2002/0175938 A1 | 11/2002 | Hackworth .................. 345/751 |
| 2002/0175955 A1 | 11/2002 | Gourdol et al. .............. 345/821 |
| 2002/0186257 A1 | 12/2002 | Cadiz et al. .................. 715/764 |
| 2002/0188515 A1 | 12/2002 | Nakata et al. |
| 2002/0196293 A1 | 12/2002 | Suppan et al. ............... 345/853 |
| 2003/0005051 A1 | 1/2003 | Gottlieb |
| 2003/0005056 A1 | 1/2003 | Yamamoto et al. |
| 2003/0009455 A1 | 1/2003 | Carlson et al. ................. 707/6 |
| 2003/0011564 A1 | 1/2003 | Ushino et al. |
| 2003/0011638 A1 | 1/2003 | Chung ......................... 345/808 |
| 2003/0011639 A1 | 1/2003 | Webb ........................... 715/808 |
| 2003/0014421 A1 | 1/2003 | Jung ............................ 707/102 |
| 2003/0014490 A1 | 1/2003 | Bates et al. .................. 709/206 |
| 2003/0016248 A1 | 1/2003 | Hayes Ubillos |
| 2003/0022700 A1 | 1/2003 | Wang ........................... 455/566 |
| 2003/0025732 A1 | 2/2003 | Prichard ...................... 345/765 |
| 2003/0025737 A1 | 2/2003 | Breinberg |
| 2003/0028560 A1 | 2/2003 | Kudrolli et al. |
| 2003/0035917 A1 | 2/2003 | Hyman ......................... 428/67 |
| 2003/0038832 A1 | 2/2003 | Sobol .......................... 715/722 |
| 2003/0043200 A1 | 3/2003 | Faieta et al. ................. 345/804 |
| 2003/0043211 A1 | 3/2003 | Kremer et al. ............... 715/838 |
| 2003/0046528 A1 | 3/2003 | Haitani et al. ................ 713/2 |
| 2003/0050986 A1 | 3/2003 | Matthews et al. |
| 2003/0066025 A1 | 4/2003 | Garner et al. ................ 715/500 |
| 2003/0069892 A1 | 4/2003 | Hind et al. |
| 2003/0069900 A1 | 4/2003 | Hind et al. |
| 2003/0070143 A1 | 4/2003 | Maslov ......................... 715/513 |
| 2003/0084035 A1 | 5/2003 | Emerick ........................ 707/3 |
| 2003/0093490 A1 | 5/2003 | Yamamoto et al. .......... 709/213 |
| 2003/0097361 A1 | 5/2003 | Huang et al. ................. 707/10 |
| 2003/0097530 A1 | 5/2003 | Abrams et al. .............. 715/530 |
| 2003/0098891 A1 | 5/2003 | Molander ..................... 715/841 |
| 2003/0106024 A1 | 6/2003 | Silverbrook et al. ......... 715/515 |
| 2003/0110191 A1 | 6/2003 | Handsaker et al. ........... 707/503 |
| 2003/0112278 A1 | 6/2003 | Driskell ....................... 715/788 |
| 2003/0132972 A1 | 7/2003 | Pang |
| 2003/0135825 A1 | 7/2003 | Gertner et al. ............... 715/513 |
| 2003/0154254 A1 | 8/2003 | Awasthi |
| 2003/0156140 A1 | 8/2003 | Watanabe ..................... 345/810 |
| 2003/0160821 A1 | 8/2003 | Yoon ............................ 345/762 |
| 2003/0163455 A1 | 8/2003 | Dettinger et al. .............. 707/3 |
| 2003/0163537 A1 | 8/2003 | Rohall et al. ................ 709/206 |
| 2003/0167310 A1 | 9/2003 | Moody et al. ................ 709/206 |
| 2003/0169284 A1 | 9/2003 | Dettinger et al. ............ 715/708 |
| 2003/0177190 A1 | 9/2003 | Moody et al. |
| 2003/0187586 A1 | 10/2003 | Katzenmaier et al. |
| 2003/0195937 A1 | 10/2003 | Kircher et al. ............... 709/207 |
| 2003/0200267 A1 | 10/2003 | Garrigues |
| 2003/0206646 A1 | 11/2003 | Brackett ...................... 382/128 |
| 2003/0218611 A1 | 11/2003 | Ben-Tovim et al. .......... 345/440 |
| 2003/0220138 A1 | 11/2003 | Walker et al. |
| 2003/0226106 A1 | 12/2003 | McKellar et al. ............. 715/513 |
| 2003/0227487 A1 | 12/2003 | Hugh ........................... 715/777 |
| 2003/0229668 A1 | 12/2003 | Malik |
| 2003/0229673 A1 | 12/2003 | Malik |
| 2003/0233419 A1 | 12/2003 | Beringer ...................... 709/206 |
| 2004/0002941 A1 | 1/2004 | Thorne et al. |
| 2004/0003351 A1 | 1/2004 | Sommerer et al. ........... 715/251 |
| 2004/0006570 A1 | 1/2004 | Gelb et al. ................... 707/102 |
| 2004/0010513 A1 | 1/2004 | Scherr et al. |
| 2004/0012633 A1 | 1/2004 | Helt ............................. 715/764 |
| 2004/0021647 A1 | 2/2004 | Iwema et al. |
| 2004/0024824 A1 | 2/2004 | Ferguson et al. |
| 2004/0030993 A1 | 2/2004 | Hong Huey et al. |
| 2004/0056894 A1 | 3/2004 | Zaika et al. .................. 345/762 |
| 2004/0061713 A1 | 4/2004 | Jennings |
| 2004/0068695 A1 | 4/2004 | Daniell et al. |
| 2004/0073503 A1 | 4/2004 | Morales et al. |
| 2004/0083432 A1 | 4/2004 | Kawamura et al. ........... 715/526 |
| 2004/0088359 A1 | 5/2004 | Simpson |
| 2004/0090315 A1 | 5/2004 | Mackjust et al. ........ 340/426.13 |
| 2004/0093290 A1 | 5/2004 | Doss et al. |
| 2004/0100504 A1 | 5/2004 | Sommer ....................... 345/810 |
| 2004/0100505 A1 | 5/2004 | Cazier ......................... 345/811 |
| 2004/0107197 A1 | 6/2004 | Shen et al. .................... 707/9 |
| 2004/0109025 A1 | 6/2004 | Hullot et al. ................. 345/764 |
| 2004/0109033 A1 | 6/2004 | Vienneau et al. ............ 345/863 |
| 2004/0117451 A1 | 6/2004 | Chung ......................... 709/207 |
| 2004/0119755 A1 | 6/2004 | Guibourge |
| 2004/0119760 A1 | 6/2004 | Grossman et al. ........... 715/854 |
| 2004/0122789 A1 | 6/2004 | Ostertag et al. |
| 2004/0125142 A1 | 7/2004 | Mock et al. .................. 345/765 |
| 2004/0128275 A1 | 7/2004 | Moehrle ....................... 707/1 |
| 2004/0133854 A1 | 7/2004 | Black ........................... 715/517 |
| 2004/0135811 A1 | 7/2004 | Pickering et al. |
| 2004/0142720 A1 | 7/2004 | Smethers .................... 455/550.1 |
| 2004/0153968 A1 | 8/2004 | Ching et al. .................. 715/513 |
| 2004/0153973 A1 | 8/2004 | Horwitz |
| 2004/0164983 A1 | 8/2004 | Khozai ......................... 345/440 |
| 2004/0168153 A1 | 8/2004 | Marvin ........................ 717/120 |
| 2004/0186775 A1 | 9/2004 | Margiloff et al. ............. 705/14 |
| 2004/0189694 A1 | 9/2004 | Kurtz et al. |
| 2004/0192440 A1 | 9/2004 | Evans et al. |
| 2004/0205536 A1 | 10/2004 | Newman et al. |
| 2004/0212640 A1 | 10/2004 | Mann |
| 2004/0215612 A1 | 10/2004 | Brody ............................ 707/3 |
| 2004/0221234 A1 | 11/2004 | Imai ............................. 715/256 |
| 2004/0221309 A1 | 11/2004 | Zaner et al. |
| 2004/0230508 A1 | 11/2004 | Minnis et al. ................. 705/35 |
| 2004/0230906 A1 | 11/2004 | Pik et al. ...................... 715/522 |
| 2004/0236796 A1 | 11/2004 | Bhatt et al. |
| 2004/0239700 A1 | 12/2004 | Baschy ......................... 715/781 |
| 2004/0243938 A1 | 12/2004 | Weise et al. .................. 715/205 |
| 2004/0260756 A1 | 12/2004 | Forstall et al. |
| 2004/0261013 A1 | 12/2004 | Wynn et al. .................. 715/511 |
| 2004/0268231 A1 | 12/2004 | Tunning ....................... 715/513 |
| 2004/0268235 A1 | 12/2004 | Wason |
| 2004/0268270 A1 | 12/2004 | Hill et al. ..................... 715/963 |
| 2005/0004989 A1 | 1/2005 | Satterfield et al. ........... 709/206 |
| 2005/0004990 A1 | 1/2005 | Durazo et al. ................ 709/206 |
| 2005/0005235 A1 | 1/2005 | Satterfield et al. ........... 715/519 |
| 2005/0005249 A1 | 1/2005 | Hill et al. ..................... 715/963 |
| 2005/0010871 A1 | 1/2005 | Ruthfield et al. ............ 715/712 |
| 2005/0015361 A1 | 1/2005 | Payton et al. |
| 2005/0021504 A1 | 1/2005 | Atchison ....................... 707/3 |
| 2005/0021521 A1 | 1/2005 | Wycoff |
| 2005/0022116 A1 | 1/2005 | Bowman et al. ............. 715/513 |
| 2005/0033614 A1 | 2/2005 | Lettovsky et al. ............. 705/5 |
| 2005/0039142 A1 | 2/2005 | Jalon et al. ................... 715/823 |
| 2005/0043015 A1 | 2/2005 | Muramatsu .................. 455/412.1 |
| 2005/0044500 A1 | 2/2005 | Orimoto et al. ............. 715/706 |
| 2005/0055449 A1 | 3/2005 | Rappold, III ................ 709/228 |
| 2005/0057584 A1 | 3/2005 | Gruen et al. .................. 715/752 |
| 2005/0060337 A1 | 3/2005 | Chou et al. |
| 2005/0071242 A1 | 3/2005 | Allen et al. |
| 2005/0086135 A1 | 4/2005 | Lu ................................ 705/30 |
| 2005/0091576 A1 | 4/2005 | Relyea et al. |
| 2005/0097465 A1 | 5/2005 | Giesen et al. ................ 715/700 |
| 2005/0108348 A1 | 5/2005 | Lee |
| 2005/0114778 A1 | 5/2005 | Branson et al. .............. 715/711 |
| 2005/0117179 A1 | 6/2005 | Ito et al. ...................... 358/1.15 |
| 2005/0132010 A1 | 6/2005 | Muller |
| 2005/0132053 A1 | 6/2005 | Roth et al. ................... 709/227 |
| 2005/0138576 A1 | 6/2005 | Baumert et al. .............. 715/862 |
| 2005/0144241 A1 | 6/2005 | Stata et al. |
| 2005/0144284 A1 | 6/2005 | Ludwig et al. ............... 709/226 |
| 2005/0144560 A1 | 6/2005 | Gruen et al. |
| 2005/0144568 A1 | 6/2005 | Gruen et al. .................. 715/822 |
| 2005/0172262 A1 | 8/2005 | Lalwani ....................... 717/109 |
| 2005/0177789 A1 | 8/2005 | Abbar et al. .................. 705/528 |

(56) References Cited

U.S. PATENT DOCUMENTS

| | | | |
|---|---|---|---|
| 2005/0183008 A1 | 8/2005 | Crider et al. | 715/517 |
| 2005/0185920 A1 | 8/2005 | Harper et al. | |
| 2005/0203975 A1 | 9/2005 | Jindal et al. | 707/204 |
| 2005/0216863 A1 | 9/2005 | Schumacher et al. | 715/827 |
| 2005/0223057 A1 | 10/2005 | Buccheit et al. | |
| 2005/0223066 A1 | 10/2005 | Buchheit et al. | |
| 2005/0223329 A1 | 10/2005 | Schwartz et al. | 715/711 |
| 2005/0234910 A1 | 10/2005 | Buchheit et al. | |
| 2005/0240902 A1 | 10/2005 | Bunker et al. | |
| 2005/0251757 A1 | 11/2005 | Farn | |
| 2005/0256867 A1 | 11/2005 | Walther et al. | 707/5 |
| 2005/0278656 A1 | 12/2005 | Goldthwaite et al. | 715/810 |
| 2005/0289109 A1 | 12/2005 | Arrouye et al. | 707/1 |
| 2005/0289156 A1 | 12/2005 | Maryka et al. | 707/100 |
| 2005/0289158 A1 | 12/2005 | Weiss et al. | 707/100 |
| 2006/0015816 A1 | 1/2006 | Kuehner et al. | 715/744 |
| 2006/0020962 A1 | 1/2006 | Stark | 725/32 |
| 2006/0026033 A1 | 2/2006 | Brydon et al. | 705/1 |
| 2006/0026145 A1 | 2/2006 | Beringer et al. | |
| 2006/0026213 A1 | 2/2006 | Yaskin et al. | 707/200 |
| 2006/0026242 A1 | 2/2006 | Kuhlmann et al. | |
| 2006/0036580 A1 | 2/2006 | Stata | 707/3 |
| 2006/0036945 A1 | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0053383 A1 | 3/2006 | Gauthier et al. | |
| 2006/0064434 A1 | 3/2006 | Gilbert et al. | 707/104.1 |
| 2006/0069604 A1 | 3/2006 | Leukart et al. | 705/9 |
| 2006/0069686 A1 | 3/2006 | Beyda et al. | 707/10 |
| 2006/0074844 A1 | 4/2006 | Frankel et al. | |
| 2006/0080303 A1 | 4/2006 | Sargent et al. | 707/3 |
| 2006/0085502 A1 | 4/2006 | Sundararajan et al. | |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0117302 A1 | 6/2006 | Mercer et al. | 717/131 |
| 2006/0129937 A1 | 6/2006 | Shafron | 715/733 |
| 2006/0132812 A1 | 6/2006 | Barnes et al. | 358/1.11 |
| 2006/0155689 A1 | 7/2006 | Blakeley et al. | 707/3 |
| 2006/0161849 A1 | 7/2006 | Miller et al. | 715/744 |
| 2006/0161863 A1 | 7/2006 | Gallo | 715/810 |
| 2006/0168522 A1 | 7/2006 | Bala | |
| 2006/0173824 A1 | 8/2006 | Bensky | 707/3 |
| 2006/0173961 A1 | 8/2006 | Turski et al. | |
| 2006/0200455 A1 | 9/2006 | Wilson | |
| 2006/0218500 A1 | 9/2006 | Sauve et al. | 715/767 |
| 2006/0242557 A1 | 10/2006 | Nortis, III | 715/234 |
| 2006/0242575 A1 | 10/2006 | Winser | 715/530 |
| 2006/0248012 A1 | 11/2006 | Kircher et al. | 705/50 |
| 2006/0259449 A1 | 11/2006 | Betz et al. | 707/1 |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294452 A1 | 12/2006 | Matsumoto | 715/236 |
| 2006/0294526 A1 | 12/2006 | Hambrick et al. | 719/315 |
| 2007/0006206 A1 | 1/2007 | Dhanjal et al. | 717/168 |
| 2007/0011258 A1 | 1/2007 | Koo | |
| 2007/0033250 A1 | 2/2007 | Levin et al. | |
| 2007/0050182 A1 | 3/2007 | Sneddon et al. | 704/2 |
| 2007/0050401 A1 | 3/2007 | Young et al. | 707/102 |
| 2007/0055936 A1 | 3/2007 | Dhanjal et al. | |
| 2007/0055943 A1 | 3/2007 | McCormack et al. | 715/746 |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061738 A1 | 3/2007 | Taboada et al. | |
| 2007/0094230 A1 | 4/2007 | Subramaniam et al. | |
| 2007/0101299 A1 | 5/2007 | Shaw et al. | |
| 2007/0106951 A1 | 5/2007 | McCormack et al. | 715/764 |
| 2007/0124696 A1 | 5/2007 | Mullender | |
| 2007/0130276 A1 | 6/2007 | Zhang et al. | |
| 2007/0143662 A1 | 6/2007 | Carlson et al. | 715/507 |
| 2007/0143671 A1 | 6/2007 | Paterson et al. | 715/209 |
| 2007/0180040 A1 | 8/2007 | Etgen et al. | 709/207 |
| 2007/0185826 A1 | 8/2007 | Brice et al. | 707/1 |
| 2007/0203991 A1 | 8/2007 | Fisher et al. | |
| 2007/0240057 A1 | 10/2007 | Satterfield et al. | 715/705 |
| 2007/0260996 A1 | 11/2007 | Jakobson | 715/781 |
| 2007/0266017 A1 | 11/2007 | Held et al. | |
| 2007/0279417 A1 | 12/2007 | Garg et al. | 345/440 |
| 2007/0282956 A1 | 12/2007 | Staats | 709/206 |
| 2007/0300168 A1 | 12/2007 | Bosma et al. | 715/820 |
| 2008/0005274 A1 | 1/2008 | Subbanna et al. | |
| 2008/0005686 A1 | 1/2008 | Singh | |
| 2008/0034304 A1 | 2/2008 | Feuerbacher et al. | 715/764 |
| 2008/0040682 A1 | 2/2008 | Sorenson et al. | 715/777 |
| 2008/0052670 A1 | 2/2008 | Espinosa et al. | |
| 2008/0077571 A1 | 3/2008 | Harris et al. | 707/5 |
| 2008/0098229 A1 | 4/2008 | Hartrell et al. | |
| 2008/0104505 A1 | 5/2008 | Keohane et al. | 715/246 |
| 2008/0109787 A1 | 5/2008 | Wang et al. | |
| 2008/0134138 A1 | 6/2008 | Chamieh et al. | 717/105 |
| 2008/0141242 A1 | 6/2008 | Shapiro | 717/174 |
| 2008/0155555 A1 | 6/2008 | Kwong | 719/315 |
| 2008/0168146 A1 | 7/2008 | Fletcher | |
| 2008/0178110 A1 | 7/2008 | Hill et al. | 715/771 |
| 2008/0216014 A1 | 9/2008 | Kurtenbach et al. | |
| 2008/0244440 A1 | 10/2008 | Bailey | |
| 2009/0007003 A1 | 1/2009 | Dukhon et al. | 715/778 |
| 2009/0012984 A1 | 1/2009 | Ravid et al. | 707/101 |
| 2009/0083656 A1 | 3/2009 | Dukhon et al. | 715/781 |
| 2009/0100009 A1 | 4/2009 | Karp | |
| 2009/0106375 A1 | 4/2009 | Carmel et al. | 709/206 |
| 2009/0144651 A1 | 6/2009 | Sprang et al. | |
| 2009/0152349 A1 | 6/2009 | Bonev et al. | |
| 2009/0158173 A1 | 6/2009 | Palahnuk et al. | |
| 2009/0192845 A1 | 7/2009 | Gudipaty et al. | |
| 2009/0217192 A1 | 8/2009 | Dean et al. | 715/777 |
| 2009/0222763 A1 | 9/2009 | Dukhon et al. | 715/808 |
| 2009/0319619 A1 | 12/2009 | Affronti | |
| 2009/0319911 A1 | 12/2009 | McCann | |
| 2010/0011310 A1 | 1/2010 | Rainisto | |
| 2010/0060645 A1 | 3/2010 | Garg et al. | 345/440 |
| 2010/0159967 A1 | 6/2010 | Pounds et al. | |
| 2010/0180226 A1 | 7/2010 | Satterfield et al. | 715/777 |
| 2010/0191818 A1 | 7/2010 | Satterfield et al. | 709/206 |
| 2010/0199261 A1 | 8/2010 | Shenfield et al. | |
| 2010/0211889 A1 | 8/2010 | Durazo et al. | 715/752 |
| 2010/0223575 A1 | 9/2010 | Leukart et al. | 715/779 |
| 2010/0293470 A1 | 11/2010 | Zhao et al. | |
| 2011/0072396 A1 | 3/2011 | Giesen et al. | 715/841 |
| 2011/0225249 A1 | 9/2011 | Forstall et al. | |
| 2011/0296322 A1 | 12/2011 | Dhanjal et al. | 715/760 |
| 2012/0179993 A1 | 7/2012 | Himberger et al. | |
| 2012/0215866 A1 | 8/2012 | Satterfield et al. | |
| 2012/0324394 A1 | 12/2012 | Harris et al. | |
| 2013/0014048 A1 | 1/2013 | Satterfield et al. | |
| 2013/0159879 A1 | 6/2013 | Affronti et al. | |
| 2013/0283207 A1 | 10/2013 | Dukhon et al. | |
| 2014/0115526 A1 | 4/2014 | Hartwell et al. | |
| 2014/0132609 A1 | 5/2014 | Garg et al. | |
| 2014/0258933 A1 | 9/2014 | Dukhon et al. | |

FOREIGN PATENT DOCUMENTS

| | | |
|---|---|---|
| CA | 2 650 016 | 9/2014 |
| CN | 1553377 | 12/2004 |
| CN | 1746914 | 3/2006 |
| CN | 101243439 | 6/2012 |
| CN | 102067166 | 6/2013 |
| CN | 102317897 | 7/2013 |
| CN | 102077163 | 10/2013 |
| CN | 102077199 B | 1/2014 |
| CN | 1755599 A | 8/2014 |
| CN | 201080021957 | 11/2014 |
| EP | 0 584 269 B1 | 3/1994 |
| EP | 0 910 007 | 4/1999 |
| EP | 1 077 405 A2 | 2/2001 |

(56) References Cited

FOREIGN PATENT DOCUMENTS

| | | |
|---|---|---|
| EP | 1 104 151 | 5/2001 |
| EP | 1 672 518 | 6/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| EP | 1 564 652 | 8/2005 |
| EP | 1 628 197 | 2/2006 |
| EP | 1 628 198 | 2/2006 |
| EP | 1 628 199 | 2/2006 |
| EP | 1 645 972 | 4/2006 |
| EP | 1 835 434 A1 | 9/2007 |
| EP | 1 915 001 | 4/2008 |
| GB | 2 329 813 | 3/1999 |
| GB | 2 391 148 | 1/2004 |
| ID | P 0027717 | 3/2011 |
| ID | P 0027754 | 3/2011 |
| ID | P 0029297 | 10/2011 |
| JP | 03-043824 | 2/1991 |
| JP | 04-186425 | 3/1992 |
| JP | 04-312186 | 11/1992 |
| JP | 05-204579 | 8/1993 |
| JP | 06-052282 | 2/1994 |
| JP | 06-342357 | 12/1994 |
| JP | 10-074217 | 3/1998 |
| JP | 10-326171 | 12/1998 |
| JP | 11-039292 | 2/1999 |
| JP | 11-175258 | 7/1999 |
| JP | 11-259200 | 9/1999 |
| JP | 2001-034775 | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2004-078512 | 3/2004 | ............... G06F 17/30 |
| JP | 2004-086896 | 3/2004 | |
| JP | 2004-102803 | 4/2004 | ............... G06F 17/30 |
| JP | 2004-512578 | 4/2004 | |
| JP | 2004-145569 | 5/2004 | ............... G06F 17/21 |
| JP | 2004-159261 | 6/2004 | |
| JP | 2004-185464 | 7/2004 | |
| JP | 2004-318842 | 11/2004 | |
| JP | 2004-342115 | 12/2004 | |
| JP | 2005-025550 | 1/2005 | |
| JP | 2005-31995 | 2/2005 | |
| JP | 2005-032041 | 2/2005 | |
| JP | 2005-182353 | 7/2005 | ............... G06F 17/30 |
| JP | 2005-352849 | 12/2005 | |
| JP | 2006-059358 | 3/2006 | |
| JP | 2007-280180 | 10/2007 | |
| JP | 2007-531165 | 11/2007 | |
| JP | 2008-047067 | 2/2008 | |
| JP | 2009-507311 | 2/2009 | |
| JP | 2005-236089 | 9/2011 | |
| JP | 4832024 | 9/2011 | |
| JP | 5021185 | 6/2012 | |
| JP | 5079701 | 9/2012 | |
| JP | 5139984 | 11/2012 | |
| JP | 5190452 | 2/2013 | |
| JP | 5193042 | 2/2013 | |
| JP | 5221757 | 3/2013 | |
| JP | 5266384 | 5/2013 | |
| JP | 09-204289 | 9/2013 | |
| JP | 2008-117019 A | 1/2014 | |
| JP | 5480894 | 2/2014 | |
| JP | 5486595 | 2/2014 | |
| JP | 5559817 | 6/2014 | |
| JP | 5559845 | 6/2014 | |
| JP | 5597698 | 8/2014 | |
| KR | 10-2003-0070685 | 2/2003 | |
| KR | 10-2005-0023805 A | 3/2005 | |
| KR | 10-2005-0036702 A | 4/2005 | |
| KR | 10-1130421 | 3/2012 | |
| KR | 10-1149960 | 5/2012 | |
| KR | 10-1149990 | 5/2012 | |
| KR | 10-1159334 | 6/2012 | |
| KR | 10-1238559 | 2/2013 | |
| KR | 10-1298338 | 8/2013 | |
| KR | 10-1298461 | 8/2013 | |
| KR | 10-1312867 | 9/2013 | |
| KR | 10-1323011 | 10/2013 | |
| MX | 315932 | 12/2013 | |
| MY | 146456 | 8/2012 | |
| MY | 147334 | 7/2013 | |
| MY | 149803 | 10/2013 | |
| PH | 1-2005-000404 | 8/2011 | |
| PH | 1-2005-000495 | 3/2014 | |
| RU | 2001-122576 A | 9/2003 | |
| RU | 2005-116667 | 11/2006 | |
| RU | 2005-120362 | 1/2007 | |
| RU | 2005-130357 | 4/2007 | |
| RU | 2322687 | 4/2008 | |
| RU | 2327205 C2 | 6/2008 | |
| RU | 2328034 | 6/2008 | |
| RU | 2332728 C2 | 8/2008 | |
| TW | 420953 | 2/2001 | |
| TW | 460839 | 10/2001 | |
| TW | 490652 | 6/2002 | |
| TW | 2003-05097 | 10/2003 | |
| TW | I254878 | 5/2006 | |
| TW | 2008-14632 | 3/2008 | |
| TW | 1368852 | 7/2012 | |
| TW | I389002 | 3/2013 | |
| TW | I389043 | 3/2013 | |
| TW | I401577 | 7/2013 | |
| WO | 92/21091 | 11/1992 | |
| WO | 94/20921 | 9/1994 | |
| WO | 96/10231 | 4/1996 | |
| WO | 96/39654 | 12/1996 | |
| WO | 98/20410 | 5/1998 | |
| WO | WO 99/04353 A1 | 1/1999 | ............... G06F 17/60 |
| WO | WO 99/27495 | 6/1999 | |
| WO | WO 01/55894 | 8/2001 | |
| WO | WO 02/091162 A3 | 11/2002 | |
| WO | WO 03/003240 A2 | 1/2003 | |
| WO | WO 03/098500 | 11/2003 | |
| WO | 2007/030727 A3 | 3/2007 | |
| WO | WO 2007/033159 A1 | 3/2007 | |
| WO | WO 2007/027737 A1 | 8/2007 | |
| WO | 2008/027477 | 3/2008 | |
| WO | WO 2008/121718 A1 | 10/2008 | |
| WO | 2009-158151 | 12/2009 | |
| WO | 2009-158171 | 12/2009 | |
| WO | 2009-158172 | 12/2009 | |
| ZA | 2010/07809 | 2/2012 | |
| ZA | 2010/07810 | 2/2012 | |
| ZA | 2010007875 | 2/2012 | |
| ZA | 2011/04850 | 12/2012 | |

OTHER PUBLICATIONS

U.S. Appl. No. 13/102,633, filed May 6, 2011 entitled "Markup Based Extensibility for User Interfaces".
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Chinese Second Office Action dated May 19, 2011 cited in Appln No. 200780020312.7.
U.S. Official Action dated May 5, 2011 in U.S. Appl. No. 10/836,154.
U.S. Official Action dated May 12, 2011 in U.S. Appl. No. 12/753,923.
U.S. Official Action dated May 19, 2011 in U.S. Appl. No. 11/430,562.

(56) References Cited

OTHER PUBLICATIONS

U.S. Official Action dated May 19, 2011 in U.S. Appl. No. 10/851,506.
Homeworking Forum; archived Dec. 6, 2004; 11 pgs.
"Look and Layout", retrieved at <<http://liv.ac.uk/csd/email/outlook/layout.htm>>, University of Liverpool, 9 pgs.
"Preview Pane in Conversation: 4 pane view", 2005, Zinbra Inc., 3 pgs.
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Second Office Action dated Jul. 14, 2011 cited in Appln No. 20680018095.3.
Chinese Decision on Rejection dated Jul. 21, 2011 cited in Appln No. 20068032789.2.
U.S. Official Action dated Apr. 23, 2010 in U.S. Appl. No. 12/144,642.
U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Aug. 3, 2011 in U.S. Appl. No. 12/142,927.
Mexican Office Action dated Oct. 3, 2011 cited in Appln. No. MX/a/2008/014849.
U.S. Official Action dated Nov. 2, 2011 cited in U.S. Appl. No. 10/836,154.
U.S. Appl. No. 13/464,572, filed May 4, 2012 entitled "Accessing an Out-Space User Interface for a Document Editor Program".
Changing a Graph Type: Ultimate Illustration of Excel 2002 for Windows XP, General Book, X-media Corp., Aug. 31, 2002, p. 224.
Mexican Office Action dated Feb. 3, 2012 cited in Appln No. MX/A/2008/002889 with summary.
Taiwan Office Action dated Feb. 8, 2012 cited in Appln No. 94123640, with Eng Lang Summary.
Israeli Office Action dated Feb. 23, 2012 cited in Appln No. 170668.
Taiwan Search Report dated Mar. 14, 2012 cited in Appln No. 094123420.
Chinese Fourth Office Action dated Apr. 27, 2012 cited in Appln No. 200680018095.3.
Japanese Notice of Rejection dated May 11, 2012 cited in Appln No. 2009-513223.
U.S. Official Action dated Apr. 26, 2012 in U.S. Appl. No. 11/782,059.
U.S. Official Action dated May 8, 2012 in U.S. Appl. No. 12/144,642.
Redmond, Tony; Excerpt from Book; Microsoft Exchange Server 2003; Published 2003; 14 pgs.
Chinese Office Action dated Jul. 2, 2012 in Appln No. 200980124944.7.
Chinese Office Action dated Jul. 12, 2012 in Appln No. 201080008789.5.
Chinese Decision on Rejection dated Jul. 31, 2012 cited in Appln No. 200680018095.3.
Chinese Office Action dated Aug. 2, 2012 in Appln No. 200980124945.1.
U.S. Appl. No. 13/595,084, filed Aug. 27, 2012 entitled "Command User Interface for Displaying Selectable Software Functionality Controls".
Mexican Office Action Summary dated Jun. 25, 2012 in Appln No. PA/a/2005/008354.
Korean Notice of Preliminary Rejection dated Jul. 2, 2012 cited in Appln No. 10-2012-0024393.
Korean Notice of Preliminary Rejection dated Jul. 19, 2012 cited in Appln No. 10-2007-7024571.
Chinese Third Office Action dated Aug. 14, 2012 in Appln No. 200980124383.0.
U.S. Official Action dated Aug. 7, 2012 in U.S. Appl. No. 10/836,154.
U.S. Appl. No. 13/615,668, filed Sep. 14, 2012 entitled "User Interface for Displaying Selectable Software Functionality Controls that are Relevant to a Selected Object".
Malaysian Examination Report dated Aug. 30, 2012 in Appln No. PI 20080400.
Chinese Second Office Action dated Sep. 12, 2012 in Appln No. 200980124944.7.
Mexican Office Action Summary dated Sep. 18, 2012 in Appln No. MX/a/2008/003342.
Chilean Office Action dated Sep. 21, 2012 cited in Appln No. 1560-2010, w/English Language Summary.
EP Communication dated Sep. 26, 2012 cited in Appln No. PCT/US2006/034993.
U.S. Official Action dated Sep. 11, 2012 in U.S. Appl. No. 12/163,784.
U.S. Official Action dated Sep. 13, 2012 in U.S. Appl. No. 13/437,031.
Inoue; "Let's Learn PowerPoint Using Actual Samples"; Nikkei PC21, Japan, Nikkei Business Publications, Inc., Apr. 1, 2008, vol. 13, No. 7, 5 pgs.—No English Translation.
Japanese Office Action dated Jan. 9, 2014 cited in JP Application No. 2012-510906 w/translation.
Malaysian Substantive Examination Report dated Jan. 15, 2014 in Appln No. PI 20080508.
Canadian Office Action dated Jan. 28, 2014 in Appln No. 2,511,101, 4 pgs.
EP Communication dated Feb. 11, 2014 cited in Appln No. 09 798 374.6.
Mexican Office Action dated Feb. 11, 2014 cited in Appln No. MX/a/2008/003342, 8 pgs.
EP Communication on Decision to Refuse dated Feb. 20, 2014 cited in Appln No. 09 006 972.5.
Australian Office Action dated Feb. 28, 2014 in Appln No. 2009262834, 3 pgs.
Australian Office Action dated Feb. 28, 2014 in Appln No. 2009262833, 3 pgs.
Australian Office Action dated Mar. 4, 2014 in Appln No. 2009260596, 4 pgs.
Australian Office Action dated Mar. 4, 2014 in Appln No. 2009271517, 3 pgs.
U.S. Official Action dated Jan. 16, 2014 in U.S. Appl. No. 13/102,633, 45 pgs.
U.S. Official Action dated Jan. 29, 2014 in U.S. Appl. No. 12/777,287, 44 pgs.
U.S. Official Action dated Feb. 4, 2014 in U.S. Appl. No. 10/607,020, 149 pgs.
U.S. Official Action dated Feb. 26, 2014 in U.S. Appl. No. 12/954,952, 38 pgs.
U.S. Official Action dated Mar. 3, 2014 in U.S. Appl. No. 11/332,822, 38 pgs.
U.S. Official Action dated Mar. 4, 2014 in U.S. Appl. No. 12/142,927, 45 pgs.
"The New "Office 2007" User Interface", Microsoft Corporation © 2005, 32 pgs.
"The New Look in Office 12 / Office 2007", OFFICE Watch, posted Sep. 20, 2005, 9 pgs.
Atwood, "Sometime a Word is Worth a Thousand Icons", Coding Horror, Feb. 22, 2006, 9 pgs.

(56) References Cited

OTHER PUBLICATIONS

PCT Written Opinion and Search Report dated Nov. 29, 2010 cited in International Application No. PCT/US2010/034277.
Egypt Official Decision dated Mar. 14, 2011 cited in Appln No. 2005080371.
Malaysian Substantive Examination Adverse Report dated Mar. 15, 2011 cited in Appln No. PI 20053260.
2nd Notice on Reexamination dated Mar. 25, 2011 cited in Appln No. 200510089514.X.
U.S. Official Action dated Mar. 14, 2011 in U.S. Appl. No. 12/163,784.
U.S. Official Action dated Apr. 21, 2011 in U.S. Appl. No. 11/445,393.
U.S. Official Action dated Apr. 21, 2011 in U.S. Appl. No. 12/574,256.
Korean Notice of Rejection dated Nov. 3, 2011 cited in Appln No. 10-2005-0067257.
Japanese Notice of Rejection dated Nov. 11, 2011 cited in Appln. No. 2008-530229.
Chinese Office Action dated Nov. 18, 2011 cited in Appln. No. 200910148820.4.
Chinese Office Action dated Nov. 29, 2011 cited in Appln. No. 200980124383.0.
Chinese Third Office Action dated Dec. 5, 2011 cited in Appln. No. 200680018095.3.
U.S. Official Action dated Oct. 25, 2011 in U.S. Appl. No. 12/144,642.
Dr. Dobb's Journal; "Windows 95 Common Controls"; May 1, 1995; 12 pgs.
Mexican Office Action Summary, dated Sep. 22, 2011 cited in Appln. No. MX/A/2008/003342.
Japanese Notice of Rejection dated Nov. 4, 2011 cited in Appln No. 2008-513476.
European Search Report dated Dec. 6, 2011 cited in Appln No. 06803424.8.
Japanese Notice of Rejection dated Dec. 16, 2011 cited in Appln No. 2008-529218.
U.S. Official Action dated Jan. 12, 2012 cited in U.S. Appl. No. 11/782,059.
Korean Notice of Rejection dated Jan. 30, 2012 cited in Appln No. 10-2004-0048176.
U.S. Official Action dated Jan. 26, 2012 in U.S. Appl. No. 12/464,584.
U.S. Appl. No. 13/437,031, filed Apr. 2, 2012 entitled "Automatic Grouping of Electronic Mail".
U.S. Appl. No. 13/427,939, filed Mar. 23, 2012 entitled "An Improved User Interface for Displaying a Gallery of Formatting Options Applicable to a Selected Object".
Douglas et al., "Dynamic Popup Menu Titles"; IP.Com Journal, IP.COM Inc., West Henrietta, NY, Aug. 1, 1992, 2 pgs.
Haden et al.; "Scrollable Popup Menu with Selection Tracking Display of Graphical Objects"; IP.Com Journal, IP.COM Inc., West Henrietta, NY, Aug. 1, 1994, 6 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs.
"Menu Selection Method for Related Attributes"; IBM Technical Disclosure Bulletin, International Business Machines Corp., vol. 33, No. 6B, Nov. 1990, 3 pgs.
Ribbons; Microsoft; © 2012 Microsoft; http://msdn.microsoft.com/en-us/library/windows/desktop/cc872782.aspx; 45 pgs.
AutoCAD 2011—Customization Guide; Feb. 2010; Autodesk, Inc.; http://images.autodesk.com/adsk/files/acad_acg.pdf; 554 pgs.
Malaysian Substantive Examination Adverse Report dated Jan. 31, 2012 cited in Appln No. PI 20053258.
Chinese Decision on Reexamination dated Feb. 1, 2012 cited in Appln No. 200510089514.X.
European Search Report dated Feb. 15, 2012 cited in Appln No. 05107157.9.
European Search Report dated Feb. 28, 2012 cited in Appln No. 05107184.3.
European Search Report dated Mar. 16, 2012 cited in Appln No. 05107186.6.
Taiwan Notice of Allowance dated Mar. 29, 2012 cited in Appln No. 10120306600.
Chilean Office Action dated Mar. 29, 2012 cited in Appln No. 1560-2010.
Chilean Office Action dated Mar. 29, 2012 cited in Appln No. 1559-2010.
India First Examination Report dated Mar. 30, 2012 cited in Appln No. 1817/DEL/2005.
Japanese Notice of Allowance dated Apr. 11, 2012 cited in Appln No. 2008-530229.
U.S. Official Action dated Apr. 5, 2012 in U.S. Appl. No. 12/163,758.
U.S. Official Action dated Apr. 19, 2012 in U.S. Appl. No. 13/102,633.
Korean Notice of Preliminary Rejection dated Nov. 12, 2012 cited in KR-10-2008-7005939.
Chilean Second Office Action dated Nov. 21, 2012 cited in Appln No. 1559-2010.
Canadian Office Action dated Nov. 23, 2012 cited in Appln No. 2,512,102.
Canadian Office Action dated Nov. 29, 2012 cited in Appln No. 2,512,047.
U.S. Official Action dated Oct. 24, 2012 in U.S. Appl. No. 13/102,633.
U.S. Official Action dated Nov. 23, 2012 in U.S. Appl. No. 11/782,059.
U.S. Official Action dated Dec. 5, 2012 in U.S. Appl. No. 12/777,287.
Microsoft Office 2007 Word Help, 3 pgs.
Alexander, Keeping New Messages Marked 'Unread' (2007), http://certcities.com/editorial/colums/story.asp?EditorialsD=243, 2 pgs.
Wiley, Microsoft® Office Outlook® 2007 for Dummies®, 9 pgs.
Israeli Office Action dated Jun. 3, 2012 cited in Appln No. 189293.
Israeli Office Action dated Aug. 29, 2012 in Appln No. 169717.
Canadian Office Action dated Nov. 29, 2012 cited in Appln No. 2,512,036.
Russian Office Action dated Dec. 12, 2012 cited in Appln No. 2010140069.
Chinese Second Office Action dated Dec. 17, 2012 cited in Appln No. 200980124644.9.
Chinese Third Office Action dated Dec. 31, 2012 in Appln No. 200980124944.7.
Chinese Second Office Action dated Dec. 31, 2012 in Appln No. 200980124945.1.
Chinese Second Office Action dated Jan. 4, 2013 in Appln No. 201080008789.5.
Chinese Office Action dated Jan. 6, 2013 in Appln No. 201080021957.4.
EP Communication dated Jan. 10, 2013 cited in Appln No. PCT/US2010/021888.
Canadian Office Action dated Jan. 18, 2013 in Appln No. 2,512,155.
U.S. Official Action dated Dec. 12, 2012 in U.S. Appl. No. 10/851,506.
U.S. Official Action dated Dec. 12, 2012 in U.S. Appl. No. 12/954,952.
U.S. Official Action dated Dec. 31, 2012 in U.S. Appl. No. 12/142,927.
U.S. Appl. No. 13/769,598, filed Feb. 18, 2013 entitled "Automatic Conversation Techniques".
Malaysian Substantive Examination Report dated Oct. 31, 2012 cited in Appln No. PI 20053260, 2 pgs.
Malaysia Substantive Examination Adverse Report dated Jan. 15, 2013 in Appln No. PI 20084401, 3 pgs.
EP Search Report dated Jan. 30, 2013 in Appln No. PCT/US2009/044059, 8 pgs.
Mexican Office Action dated Feb. 5, 2013 cited in Appln No. MX/a/2008/014849, 8 pgs.
Chinese Office Action dated Feb. 5, 2013 cited in Appln No. 200910148820.4, 5 pgs.
Mexican Office Action dated Feb. 25, 2013 in Appln No. MX/a/2008/002889, 11 pgs.

(56) References Cited

OTHER PUBLICATIONS

U.S. Official Action dated Mar. 1, 2013 in U.S. Appl. No. 11/430,562, 66 pgs.
Miser, "Special Edition Using Mac OS X v10.2"; Pub. Date Jan. 3, 2003; QUE; Spe. Ed.; pp. 272-275.
Mori et al., "Design and Development of Multidevice User Interfaces through Multiple Logical Descriptions"; Aug. 2004; vol. 30; 14 pgs.
Canadian Office Action dated Nov. 29, 2012 cited in Appln No. 2,511,101 3 pgs.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Japanese Notice of Preliminary Rejection dated Mar. 12, 2013 in Appln No. 2011-516371, 4 pgs.
Korean Notice of Preliminary Rejection dated Mar. 19, 2013 in Appln No. 10-2008-7005659, 4 pgs.
Japanese Notice of Preliminary Rejection dated Mar. 19, 2013 in Appln No. 2011-514652, 6 pgs.
Chinese Fourth Office Action dated Apr. 23, 2013 cited in Appln No. 200980124944.7, 7 pgs.
U.S. Official Action dated Mar. 14, 2013 in U.S. Appl. No. 12/574,256, 73 pgs.
U.S. Official Action dated Apr. 1, 2013 in U.S. Appl. No. 12/163,784, 39 pgs.
U.S. Official Action dated Apr. 4, 2013 in U.S. Appl. No. 11/782,059, 39 pgs.
U.S. Official Action dated Apr. 18, 2013 in U.S. Appl. No. 10/851,506, 34 pgs.
Israeli Office Action dated Jun. 18, 2013 cited in Appln No. 170668.
EP Communication dated Jul. 17, 2013 in Appln No. EP 07 795 391.7.
Chinese Second Office Action dated Aug. 5, 2013 in Appln No. 201080021957.4.
Russian Decision on Grant dated Aug. 12, 2013 in Appln No. 2010151922/08.
U.S. Official Action dated Aug. 2, 2013 in U.S. Appl. No. 12/777,287, 47 pgs.
U.S. Official Action dated Aug. 14, 2013 in U.S. Appl. No. 11/332,822, 102 pgs.
U.S. Official Action dated Aug. 19, 2013 in U.S. Appl. No. 10/851,506, 24 pgs.
U.S. Official Action dated Aug. 30, 2013 in U.S. Appl. No. 12/574,256, 31 pgs.
U.S. Official Action dated Sep. 6, 2013 in U.S. Appl. No. 12/028,797, 113 pgs.
U.S. Appl. No. 13/925,523, filed Jun. 24, 2013 entitled "Communication Between a Document Editor-in-Space User Interface and a Document Editor Out-Space User Interface", Dukhon et al.
U.S. Appl. No. 14/032,094, filed Sep. 19, 2013 entitled "User Interface for Displaying Selectable Software Functionality Controls that are Relevant to a Selected Object", Satterfield et al.
Mexican Office Action dated Jun. 11, 2013 cited in Appln. No. MX/a/2008/003342.
Canadian Office Action dated Sep. 18, 2013 in Appln No. 2,512,036.
Japanese Notice of Rejection dated Sep. 19, 2013 in Appln No. 2012-153634.
Mexican Office Action dated Sep. 27, 2013 in Appln No. MX/a/2008/014849.
EP Communications to Attend Oral Proceedings dated Oct. 4, 2013 in Appln No. 09 006 972.5.
Canadian OA dated Oct. 7, 2013 in Appln No. 2,650,016.
Chilean Third Office Action dated Oct. 9, 2013 in Appln No. 2512-2005.
Mexican Office Action dated Oct. 28, 2013 cited in Appln No. MX/a/2010/013566.
Mexican Office Action dated Jul. 9, 2013 in Appln No. MX/a/2008/002889.
Israeli Office Action dated Oct. 17, 2013 cited in Appln No. 1611334.
India First Examination Report dated Oct. 21, 2013 cited in Appln No. 1017/DEL/2004.
Canadian Office Action dated Oct. 30, 2013 in Appln No. 2,512,047.
Korean Notice of Preliminary Rejection dated Nov. 7, 2013 cited in KR-10-2008-7029272.
Canadian Office Action dated Nov. 15, 2013 in Appln No. 2,512,102.
U.S. Official Action dated Nov. 8, 2013 in U.S. Appl. No. 13/615,668, 114 pgs.
U.S. Official Action dated Nov. 15, 2013 in U.S. Appl. No. 11/782,059, 33 pgs.
U.S. Official Action dated Nov. 29, 2013 in U.S. Appl. No. 12/144,642, 73 pgs.
U.S. Appl. No. 14/142,132, filed Dec. 27, 2013 entitled "Expanded Search and Find User Interface".
U.S. Appl. No. 14/150,531, filed Jan. 8, 2014 entitled "Modifying and Formatting a Chart Using Pictorially Provided Chart Elements".
Mexican Office Action dated Aug. 20, 2013 in Appln No. MX/a/2011/011749.
Chinese Third Office Action dated Dec. 4, 2013 in Appln No. 200680032789.2.
Canadian Office Action dated Dec. 5, 2013 in Appln No. 2,618,169.
Chinese Decision on Rejection dated Jan. 13, 2014 in Appln No. 200980124644.9.
U.S. Official Action dated Dec. 6, 2013 in U.S. Appl. No. 10/851,506, 25 pgs.
U.S. Appl. No. 14/226,421, filed Mar. 24, 2014 entitled "Exposing Non-Authoring Features Through Document Status Information in an Out-Space User Interface".
EP Communication dated Jan. 27, 2014 in Appln No. 09 767 2208, 7 pgs.
Norway Office Action dated Feb. 10, 2014 in Appln No. 20053655, 4 pgs.
Norway Office Action dated Feb. 10, 2014 in Appln No. 20053658, 4 pgs.
Chilean Office Action dated Mar. 30, 2014 in Appln No. 2804-2011, 7 pgs.
Chinese Third Office Action dated Apr. 3, 2014 in Appln No. 201080021957.4, 6 pgs.
U.S. Official Action dated Apr. 18, 2014 in U.S. Appl. No. 11/782,059, 42 pgs.
Ramamritham et al., Scheduling Algorithms and Operating Systems Support for Real-Time Systems; © 1994; IEEE; 13 pages.
Zweben et al., Scheduling and Rescheduling with Iterative Repair, © 1993; IEEE; 9 pages.
Taiwan Office Action dated Mar. 17, 2014 in Appln. No. 98118252, 10 pgs.
India First Examination Report dated Mar. 19, 2014 in Appln No. 1818/DEL/2005, 1 pg.
Canadian Office Action dated Apr. 25, 2014 in Appln No. 2,512,155, 9 pgs.
Australian Second Office Action dated Apr. 29, 2014 in Appln No. 2009271517, 3 pgs.
Philippines Substantive Examination Report dated Apr. 30, 2014 cited in Appln No. 1-2008-500356, 1 pg.
U.S. Official Action dated Apr. 25, 2014 in U.S. Appl. No. 12/028,797, 42 pgs.
"Creating Charts: An Introduction," Excel for Chemists: . A Comprehensive Guide, E. Joseph Billo. http://www.ahut.edu.cn/yxsz/ahk/Teaching/Excel%for%20Chemists/ChQ2.pdf.
Bellavista et al., "A Mobile Infrastructure for Terminal, User, and Resource Mobility", Network Operations and Management Symposium, NOMS 2000, pp. 877-890, IEEE/IFIP.
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx.
"What's New in Excel 2007", Feb. 26, 2007.

(56) References Cited

OTHER PUBLICATIONS

Whitechapel et al., "Microsot Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in.
Australian Search Report dated Jan. 16, 2007 cited in Singapore Application No. 200504474-8.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0-2211 PCT/.
Australian Written Opinion/Search Report cited in Singapore Application No. 200505257-6 mailed Feb. 12, 2007.
European Search Report dated Nov. 25, 2008 cited in Application EP 06 79 0087.
Mexican Office Action dated Mar. 3, 2009 cited in Appln No. PA/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
Russian Office Action dated Dec. 28, 2009 cited in Appln No. 2005125836/09(029010).
Mexican Office Action dated May 4, 2010 cited in Appln No. 2005/008354.
Israeli Office Action dated Jul. 5, 2010 cited in Appln No. 169718.
Chinese Second Office Action dated Jul. 6, 2010 cited in Appln No. 200680033212.3.
Israeli Office Action dated Oct. 28, 2010 cited in Appln No. 169716.
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Sep. 26, 2007 in U.S. Appl. No. 11/151,686.
U.S. Official Action dated Feb. 22, 2008 in U.S. Appl. No. 11/445,393.
U.S. Official Action dated Jul. 24, 2008 in U.S. Appl. No. 11/151,686.
U.S. Official Action dated Oct. 8, 2008 in U.S. Appl. No. 11/445,393.
U.S. Official Action dated Oct. 28, 2008 in U.S. Appl. No. 11/151,686.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
U.S. Official Action dated Dec. 8, 2009 in U.S. Appl. No. 11/151,686.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 29, 2010 in U.S. Appl. No. 12/028,787.
U.S. Official Action dated Jan. 5, 2011 in. U.S. Appl. No. 11/823,999.
U.S. Official Action dated Feb. 11, 2011 in U.S. Appl. No. 11/401,470.
Seo et al, "Hangul Office 2000 Tutoring Book", Sep. 15, 2000, 16 pgs.
Office 2007, Microsoft, Released on Nov. 6, 2006, 23 pgs.
Mexican Office Action dated Feb. 5, 2009 cited in Appln No. PA/a/2005/008349.
Mexican Office Action dated Jan. 6, 2011 cited in Appln No. PA/a/2005/008354.
Mexican Office Action dated Mar. 31, 2011 cited in Appln No. PA/a/2005/008351.
Mexican Office Action dated Mar. 31, 2011 cited in Appln No. PA/a/2005/008349.
Mexican Office Action dated Mar. 31, 2011 cited in Appln No. PA/a/2005/008350.
Korean Notice of Rejection dated May 17, 2011 cited in Appln No. 10-2004-48176.
Russian Office Action dated Jun. 14, 2011 cited in Appln No. 2008147090.
Chinese Third Office Action dated Jun. 21, 2011 cited in Appln No. 200680030421.2.
U.S. Official Action dated Jun. 9, 2011 in U.S. Appl. No. 12/464,584.
U.S. Official Action dated Jul. 8, 2011 in U.S. Appl. No. 11/401,470.
U.S. Official Action dated Jul. 8, 2011 in U.S. Appl. No. 12/163,784.
Ohmori, Yasuo et al., "Eigyo Mind—A Sales Support Tool," PFU Tech. Rev., vol. 10, No. 1, pp. 32-38, PFU Limited, May 1, 1999.
Mexican Office Action dated May 26, 2011 cited in Appln. No. MX/a/2009/004151.
Korean Notice of Preliminary Rejection dated Jul. 22, 2011 cited in Appln No. 10-2005-0058160.
Japanese Notice of Rejection dated Aug. 12, 2011 cited in Appln. No. 2005-184990.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Oct. 5, 2009 in U.S. Appl. No. 11/332,822.
U.S. Official Action dated Sep. 13, 2011 in U.S. Appl. No. 12/372,386.
U.S. Official Action dated Sep. 14, 2011 in U.S. Appl. No. 12/163,758.
EP Search Report dated Apr. 18, 2013 in Appln No. PCT/US2006/012724, 12 pgs.
Philippines Substantive Examination Report dated Apr. 25, 2013 cited in Appln No. 1-2005-000495.
Mexican Office Action dated May 23, 2013 in Appln No. MX/a/2008/003342.
U.S. Official Action dated Apr. 29, 2013 in U.S. Appl. No. 12/954,952, 18 pgs.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
Russel et al., (hereinafter "Russel"); "Special Edition Using Microsoft® Office Outlook® 2003"; Que publishing on Sep. 25, 2003, 71 pgs.
Israeli Office Action dated May 3, 2012 cited in Appln No. 169718.
Taiwan Office Action dated May 14, 2012 cited in Appln No. 94122180, with Eng Lang Summary.
Mexican Office Action dated Jun. 6, 2012 cited in Appln No. MX/a/2008/014849.
Chinese Second Office Action dated Jun. 18, 2012 in Appln No. 200910148820.4.
U.S. Official Action dated Jun. 6, 2012 in U.S. Appl. No. 12/777,287.

(56) References Cited

OTHER PUBLICATIONS

U.S. Official Action dated Jun. 19, 2012 in U.S. Appl. No. 12/769,787.
Aoyagi, Hideo, "Mail Mac Fan Special 33"; Manichi Communications Inc., Mar. 1, 2004, 5 pgs.
Morita, Utako; "Literature Searching System, 'JDream'"; Online Search; vol. 23, No. 4; The Society of Japan Terminal, Dec. 2002; 5 pgs.
Milstein, Sarah; "The Missing Manual: The book that should have been in the box", First Edition; O'Reilly Japan, Inc.; Nov. 25, 2004; 1 pg.
Cole; "New Arrival! Forefront of Downloading"; Mac People; vol. 11, No. 10; ASCII Corporation; Aug. 31, 2005; 1 pg.
Sada, Morihiro; "Clue for Managing Common Data Filed on Server"; Business Personal Computer Age; vol. 15, No. 7; Dempa Publications, Inc.; Jul. 1, 1997; 1 pg.
Japanese Notice of Rejection dated Nov. 25, 2011 cited in Appln. No. 2008-531249.
Malaysian Substantive Examination Adverse Report dated Jan. 31, 2012 cited in Appln No. PI 20053259.
Japanese Notice of Rejection dated Feb. 3, 2012 cited in Appln No. 2008-530218.
European Search Report dated Feb. 23, 2012 cited in Appln No. 05107153.8.
Chinese Office Action dated Feb. 29, 2012 cited in Appln No. 200980124664.9.
Chinese Decision on Rejection dated Mar. 7, 2012 cited in Appln No. 200780020312.7.
Chinese Second Office Action dated Mar. 9, 2012 cited in Appln No. 200980124383.0.
Japanese Notice of Final Rejection dated Mar. 9, 2012 cited in Appln No. 2008-513476.
U.S. Official Action dated Feb. 27, 2012 in U.S. Appl. No. 12/372,386.
U.S. Official Action dated Mar. 14, 2012 in U.S. Appl. No. 12/142,927.
U.S. Appl. No. 11/154,278, filed Jun. 16, 2005 entitled "Cross Version and Cross Product User Interface Compatibility".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".
U.S. Appl. No. 10/955,942, filed Sep. 30, 2004 entitled "An Improved User Interface for Displaying a Gallery of Formatting Options Applicable to a Selected Object".
U.S. Appl. No. 10/955,928, filed Sep. 30, 2004 entitled "User Interface for Providing Task Management and Calendar Information".
U.S. Appl. No. 10/800,056, filed Mar. 12, 2004 entitled "Method and System for Data Binding in a Block Structured User Interface Scripting Language".
U.S. Appl. No. 12/372,386, filed Feb. 17, 2009 entitled "Command User Interface for Displaying Multiple Sections of Software Functionality Controls".
U.S. Appl. No. 12/574,256, filed Oct. 6, 2009 entitled "Modifying a Chart".
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
U.S. Appl. No. 12/769,787, filed Apr. 29, 2010 entitled "Conversation Grouping of Electronic Mail Records".
U.S. Appl. No. 12/777,287, filed May 11, 2010 entitled "User Interface for Providing Task Management and Calendar Information".
U.S. Appl. No. 11/217,071, filed Aug. 30, 2005 entitled "Markup Based Extensibility for User Interfaces".
Charles Rich et al., "Segmented Interaction History in a Collaborative Interface Agent," 1997, ACM, pp. 23-30.
Andrew Dwelly, "Functions and Dynamic User Interface," 1989, ACM, pp. 371-381.
Gordon Kurtenbach et al., "The Hotbox: Efficient Access to a Large Number of Menu-items," ACM, 1999, pp. 231-237, May 1999.
Charles Rich et al., "Adding a Collaborative Agent to Graphical User Interfaces," 1996, ACM, pp. 21-30.
Boyce, "Microsoft Outlook Inside Out," 2001, pp. 67, 68, 109, 110, 230, 231, 310, 316-318, 798.
Halvorson et al., "Microsoft Office XP Inside Out," 2001, pp. 1005-1009, 1015, 1023-1028, 1036-1039, 1093.
Riggsby et al., "Mastering Lotus Notes and Domino 6," 2003, pp. 135-139.
Riggsby et al., "Mastering Lotus Notes and Domino 6," 2003, pp. 135-138, 607-612.
Khare et al., "The Origin of (Document) Species," University of California, 1998, 9 pgs.
"Separate Structure and Presentation," http://www.webreference.com/html/tutorial5/1.html, Aug. 20, 1998, 4 pgs.
"The Style Attribute and CSS Declarations," http://www.webreference.com/html/tutorial5/2, Aug. 20, 1998, 4 pgs.
"What's Hot in Internet Services?" http://www.webreference.com/html/tutorial5/3, Aug. 20, 1998, 3 pgs.
"The Style Element & CSS Selectors," http://www.webreference.com/html/tutorial5/4.html, Aug. 20, 1998, 3 pgs.
http://www.webreference.com/html/tutorial5/5.html, Aug. 20, 1998, 3 pgs.
"ID & Class Selectors, Pseudoclasses," http://www.webreference.com/html/tutorial5/6.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
"External Style Sheets," http://www.webreference.com/html/tutorial5/9.html, Aug. 20, 1998, 3 pgs.
Raman, "Cascaded Speech Style Sheets," 1997, 7 pgs.
"Primary Windows," Accessed at http://www-03.ibm.com/servers/eserver/iseries/navigator/guidelines/primary.html on Feb. 23, 2007, 23 pgs.
Schumaker, "User Interface Standards," http://msdn2.microsoft.com/en-us/library/aa217660(office.11.d=printer).aspx, Sep. 2001, 5 pgs.
Budinsky et al., "WebSphere Studio Overview," http://researchweb.watson.ibm.com/journal/sj/432/budinsky.html, May 6, 2004, 25 pgs.
Becker et al., "Virtual Folders: Database Support for Electronic Messages Classification," Pontificia Universidade Catolica do Rio Grande do Sul, Porto Alegre, Brazil, pp. 163-170.

(56) References Cited

OTHER PUBLICATIONS

Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.

Marshall School of Business: "Workshop IV—Calendar," http://www.marshall.usc.edu/computing/PDF_Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version 2002.03.25, http://www.uakron.edu/its/learning/training/docs/Calendar032502.pdf, Mar. 25, 2002, pp. 1-52.

Screen Dumps of Microsoft Outlook (1999, pp. 1-3).

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.

Microsoft Windows XP Professional, Version 2002, Service pack 2, 3 pgs.

Camarda, Using Microsoft Word 97, copyright 1997, QUE Corporation, pp. 412, 869.

Marshall School of Business, Workshop 1—Introduction to Outlook & E-mail, Apr. 6, 2000, pp. 1-11.

Jane Dorothy Calabria Burke, Ten Minute Guide to Lotus Notes 4.6, Publication date: Dec. 23, 1997, 2 pgs.

Bill Dyszel, Microsoft Outlook 2000 for Windows for Dummies, Copyright 1999, pp. 82-86, 102-103, 141,143.

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.

Screen Dumps Microsoft Corporation, Microsoft Office Professional Edition 2003, 4 pp.

Screen Dumps Microsoft Corporation, Microsoft Office Professional Edition 2003, 5 pp.

Habraken, Microsoft Office XP 8 in 1, published Jun. 5, 2001, http://proquest.safaribooksonline.com/0789725096/, 12 pp.

Word 2002, Chapter 14; Paradigm Publishing Inc., copyright 2002; http://www.emcp.com/tech_tutorials/sig_irc/Signature_Word_Chapter_14.ppt, 21 pp.

Microsoft Office Word 2003, Part of Microsoft Office Professional Edition 2003, 1983-2003 Microsoft Corporation, 5 pp.

Microsoft Office 11 Beta Layperson's Specification, Copyright 2002, Microsoft Corporation, 28 pages.

FrontPage 11 Beta Layperson's Specification, Copyright 2002, Microsoft Corporation, 12 pages.

Office 11 Beta Letter, Copyright 2002, Microsoft Corporation, 6 pages.

Microsoft XDocs Beta Layperson Specification, Copyright 2002, Microsoft Corporation, 3 pages.

Microsoft Publisher 11 Beta Layperson's Specification, Copyright 2002, Microsoft Corporation, 13 pages.

Microsoft Office Word 2003, Part of Microsoft Office Professional Edition 2003, 1983-2003 Microsoft Corporation, screen shot 1, 1 pp.

Microsoft Office 2003, Microsoft Office Professional Edition 2003, Microsoft Corporation, 10 pages.

Screendumps—Microsoft Office, Microsoft Office Professional Edition 2003, Microsoft Corporation, 10 pages.

Screendumps—Microsoft Office Outlook, Microsoft Office Outlook Professional Edition 2003, Microsoft Corporation, 2 pages.

Nielsen, Jacob. "Tabs, Used Right," Alertbox, Sep. 17, 2007, http://www.useit.com/alertbox/tabs.html, 6 pages.

"Managing the Code Editor and View" Microsoft Corporation, http://msdn.microsoft.com/en-us/library/z01zks9a(VS.71).aspx, 2008.

Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.

"Omni Web Help," Omni Group, 2004, http://www.omnigroup.com/documentation/omniweb/browser/tabs.html, 2 pages.

Hepfner, Troy, "New SOCET CXP Interface Improves Usability," Sep. 2008, http://www.socetset.com/gxpmosaic/?p=95, 4 pages.

"TeeChart for .NET Charting Control," Steema Software; accessed at: http://www.teechart.net/; accessed on Jan. 11, 2006.

"Convert to Word 2007," http://www.regencytraining.com/word-2007-conversion.html, *Regency Training and Consulting*, 2 pages (Date Printed Apr. 21, 2008).

"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).

"Inter-Widget Communication," http://web.mit.edu/6.115/www/miscfiles/amulet/amulet-help/IWC.htm, 6 pages (Feb. 13, 2007).

"The Technology in Document and Check Security," http://www.securedoc.in/thetechnology.htm, 7 pages (Date Printed Apr. 21, 2008).

Ando, R. et al., "Visualization-enabled multi-document summarization by Iterative Residual Rescaling," *Natural Language Engineering*, vol. 11, No. 1, pp. 67-86 (Mar. 2005) (2 page Abstract).

Bos, B, "Re: A proposal for addition to HTML 3.0: Frames," http://www.nyct.net/~aray/htmlwg/95q3/1141.html, 5 pages (Sep. 21, 1995).

de Candussio, N., "Common GUI Features Report," *Herschel CSDT Meeeting*, pp. 1-21 (Sep. 2007).

Krill, P., "Microsoft's Ribbon Interface Draws Frowns, Smiles," *InfoWorld*, http://www.infoworld.com/article/08/03/04/10NF-microsoft-fluentui_1.html, 3 pages (Mar. 4, 2008).

Rice, F, "Customizing the 2007 Office System Document Inspector," http://msdn2.microsoft.com/en-us/library/aa338203(d=printer).aspx, 10 pages (May 2006).

Boyce, "Microsoft Outlook Inside Out," 2001, pp. 133, 134, 721-728.

Halvorson et al., "Microsoft Office XP Inside Out," 2001, pp. 4, 5, 10, 11, 70-74, 281-288, 1010-1014.

Pogue, David. "Windows XP Home Edition: The Missing Manual," O'Reilly, 1st Edition, May 1, 2002, pp. 37, 38, 41.

Screendumps—Microsoft Office, Microsoft Corporation, Microsoft Office Professional Edition 2003, 13 pages.

Berliner E.M. et al., "Microsoft Office 2003", Feb. 24, 2004, p. 39-40, 120-124, 175-177, 233-234 [D1].

Berliner E.M. et al., "Microsoft Office 2003", Feb. 24, 2004, p. 173-178 [D2].

Perronne et al. "Building Java Enterprise Systems with J2EE", Publisher: Sams, Pub Date: Jun. 7, 2000 (pp. 1-8).

Padwick, Gordon "Using Microsoft Outlook 2000," 1999 Que Publishing, pp. 530-533.

Slovak, Ken. "Absolute Beginner's Guide to Microsoft Office Outlook 2003." 2003, Que Publishing, pp. 237-241.

Microsoft Press, Microsoft Computer Dictionary, Microsoft Press, Fifth Edition, 2002, pp. 374, 382.

Riggsby, McCoy, Haberman and Falciani, "Mastering Lotus Notes and Domino 6 " 2003, pp. 18, 22, 33-35, 47, 122, 123, 215-241, 378.

"About Google Desktop Search", http://www.desktop.google.com/about.html, Oct. 15, 2004, 8 pages.

Find any file or email on your PC as fast as you can type!, http://www.x1.com, 2003, 1 page.

"Lookout", http://www.lookoutsoft.com, Apr. 22, 2005, 20 pages.

"Yahoo to test desktop search", http://news.com.com/yahoo+to+test+desktop+searcach/2100-1032_3-5486381.html, Dec. 9, 2004, 6 pages.

"Microsoft reinvents its own wheel", http://www.theinquirer.net/default.aspx?article=20214, Dec. 14, 2004, 5 pages.

"Microsoft Desktop Search (beta)", http://www.pcmag.com/article2/0.1895.1771841.00.asp, Mar. 2, 2005.

"Windows Desktop Search". Http://kunal.kundale.net/reviews/wds.html, Jul. 10, 2005, 7 pages.

"Microsoft Enters Desktop Search Fray", http://www.internetnews.com/ent-news/article.php/3447331, Dec. 13, 2004, 5 pages.

(56) References Cited

OTHER PUBLICATIONS

Screendumps—Microsoft Office (Microsoft Corporation, Microsoft Office Professional Edition 2003; 16 pages).
Clifton, The Application Automation layer—Using XML to Dynamically Generale GUI Elements—forms and controls, The Code Project, Jun. 2003, pp. 1-37.
ScreenShot of MS_Office_2003; (Microsoft Corporation, Microsoft Office Professional Edition 2003; 6 pages).
Danish Written Opinion Appl. No. SG 200504508-3 dated Sep. 18, 2006.
Danish Search Report Appl. No. SG 200504475-5 dated Sep. 19, 2006.
NZ Application No. 541301, Examination Report dated Jul. 25, 2005.
NZ Application No. 541300, Examination Report dated Jul. 25, 2005.
NZ Application No. 541299, Examination Report dated Jul. 25, 2005.
PCT Written Opinion and Search Report dated Jan. 9, 2007 cited in International Application No. PCT/US2006/033809.
International Search Report dated Oct. 17, 2007 cited in International Application No. PCT/US2006/012724.
International Search Report dated Nov. 27, 2007 cited in PCT/US2007/012573, 9 pages.
Chinese First Office Action dated Mar. 21, 2008 cited in Application No. 200510092146.4.
Chinese First Office Action dated Mar. 21, 2008 cited in Application No. 200510092139.4.
Chinese First Office Action dated Apr. 11, 2008 cited in Application No. 200510092141.1.
Chinese First Office Action dated Apr. 18, 2008 cited in Application No. 200510092142.6.
Philippines Examiner's Action dated Apr. 21, 2008 cited in Application No. 1-2005-000405.
Philippines Examiner's Action dated Apr. 21, 2008 cited in Application No. 1-2005-000406.
Chilean Office Action dated Mar. 28, 2008 cited in Application No. 1770-05, no English Translation.
Chinese First Office Action dated May 23, 2008 cited in Application No. 200510089514.X.
European Summons to Attend Oral Proceedings dated Jun. 23, 2008 cited in Application No. 04102463.9.
Philippines Examiner's Action dated Jul. 31, 2008 cited in Application No. 12005000495.
Philippines Examiner's Action dated Aug. 19, 2008 cited in Application No. 12005000405.
Philippines Examiner's Action dated Sep. 12, 2008 cited in Application No. 1200500406.
Chinese Second Office Action dated Oct. 10, 2008 cited in Application No. 200510092141.1.
Chinese Second Office Action dated Oct. 17, 2008 cited in Application No. 200510092139.4.
Chinese Second Office Action dated Nov. 21, 2008 cited in Application No. 200510089514.X.
Chilean Office Action dated Nov. 27, 2008 cited in Application No. 1768-2005.
Chilean Office Action dated Sep. 23, 2008 cited in Application No. 1770-2005.
Chilean Office Action dated Nov. 27, 2008 cited in Application No. 1769-2005.
Chilean Second Office Action dated Mar. 4, 2009 cited in Application No. 2512-2005.
European Office Action mailed Mar. 9, 2009, cited in Application No. 06790087.8.
Chinese Office Action dated Apr. 3, 2009 cited in Application No. 200510089514.X.
Supplementary European Search Report dated Jun. 9, 2009 cited in EP Application No. 07795391.7-1225.
Mexican Office Action dated Jun. 19, 2009 cited in Application No. PA/a/2005/007073.
Chinese Office Action dated Jul. 3, 2009 cited in Application No. 200680018095.3.
Russian Office Action dated Jul. 21, 2009 cited in Application No. 2005125837/09(029011).
Russian Office Action dated Jul. 30, 2009 cited in Application No. 2005125831/09(029005).
Israeli Office Action dated Sep. 6, 2009 cited in Application No. 169716.
Israeli Office Action dated Sep. 7, 2009 cited in Application No. 169718.
European Search Report dated Sep. 7, 2009 cited in Application No. 09006972.5-2211.
Russian Office Action dated Sep. 10, 2009 cited in Application No. 2005125836/09(029010).
Russian Office Action dated Sep. 10, 2009 cited in Application No. 2005125839/09(029013).
European Communication dated Sep. 14, 2009 cited in Application No. 07795391.7-1225.
European Communication dated Sep. 28, 2009 cited in Application No. 09006972.5-2211.
Israeli Office Action dated Oct. 12, 2009 cited in Application No. 170668.
Chinese Office Action dated Oct. 16, 2009 cited in Application No. 200510092142.6.
Russian Office Action dated Oct. 26, 2009 cited in Application No. 2005120363/09(023023).
Russian Office Action dated Oct. 30, 2009 cited in Application No. 2005125837/09(029011).
Chilean Second Office Action dated Nov. 4, 2009 cited in Application No. 1770-2005.
Chinese Office Action dated Nov. 27, 2009 cited in Application No. 200680033212.3.
PCT Search Report and Written Opinion dated Nov. 30, 2009 cited in International Application No. PCT/US2009/046341.
Chilean Second Office Action dated Dec. 4, 2009 cited in Application No. 1768-2005.
Russian Office Action dated Dec. 28, 2009 cited in Application No. 2005125836/09(029010).
PCT Search Report and Written Opinion dated Dec. 29, 2009 cited in International Application No. PCT/US2009/046344.
Chinese Office Action dated Jan. 22, 2010 cited in Application No. 200680032564.7.
Chilean Second Office Action dated Jan. 29, 2010 cited in Application No. 1769-2005.
Chinese Third Office Action dated Feb. 12, 2010 cited in Application No. 200510092142.6.
Philippines Examiner's Action dated Mar. 11, 2010 cited in Application No. 1-2005-000405.
Chinese Office Action dated Mar. 11, 2010 cited in Application No. 200780020312.7.
Australian Office Action dated Mar. 25, 2010 cited in Application No. 2005203411.
Australian Office Action dated Mar. 25, 2010 cited in Application No. 2005203412.
Australian Office Action dated Mar. 26, 2010 cited in Application No. 2005203409.
Australian Office Action dated Apr. 8, 2010 cited in Application No. 2005203410.
Australian Office Action dated May 28, 2010 cited in Application No. 2005202717.
Mexican Office Action dated Aug. 12, 2010 cited in Application No. 2005/008354.
PCT Written Opinion and Search Report dated Sep. 2, 2010 cited in International Application No. PCT/US2010/021888.
Malaysian Substantive Examination Adverse Report dated Sep. 30, 2010 cited in Application No. PI 20052959.
Australian Office Action dated Oct. 21, 2010 cited in Application No. 2006284908.
Chinese Second Office Action dated Oct. 29, 2010 cited in Application No. 200680030421.2.
U.S. Official Action dated Dec. 23, 2003 cited in U.S. Appl. No. 09/896,384.
U.S. Official Action dated Apr. 27, 2006 cited in U.S. Appl. No. 10/800,056.

(56) References Cited

OTHER PUBLICATIONS

U.S. Final Official Action dated Oct. 19, 2006 cited in U.S. Appl. No. 10/800,056.
U.S. Official Action dated Apr. 12, 2007 cited in U.S. Appl. No. 10/851,506.
U.S. Official Action dated Jun. 4, 2007 cited in U.S. Appl. No. 10/955,940.
U.S. Official Action dated Jul. 26, 2006 cited in U.S. Appl. No. 10/741,407.
U.S. Final Official Action dated Jan. 23, 2007 cited in U.S. Appl. No. 10/741,407.
U.S. Official Action dated Jan. 4, 2007 cited in U.S. Appl. No. 10/607,020.
U.S. Official Action dated Jun. 14, 2007 cited in U.S. Appl. No. 10/836,154.
U.S. Official Action dated Jun. 21, 2007 cited in U.S. Appl. No. 10/955,928.
U.S. Official Action dated Jul. 11, 2007 cited in U.S. Appl. No. 10/955,941.
U.S. Official Action dated Jul. 11, 2007 cited in U.S. Appl. No. 10/955,967.
U.S. Official Action dated Jul. 11, 2007 cited in U.S. Appl. No. 10/955,942.
U.S. Official Action dated Jul. 13, 2007 cited in U.S. Appl. No. 10/800,056.
U.S. Official Action dated Sep. 6, 2007 cited in U.S. Appl. No. 11/136,800.
U.S. Official Action dated Oct. 9, 2007 cited in U.S. Appl. No. 10/982,073.
U.S. Official Action dated Dec. 4, 2007 cited in U.S. Appl. No. 10/955,940.
U.S. Official Action dated Dec. 21, 2007 cited in U.S. Appl. No. 10/851,506.
U.S. Official Action dated Dec. 28, 2007 cited in U.S. Appl. No. 10/800,056.
U.S. Official Action dated Jan. 8, 2008 cited in U.S. Appl. No. 10/955,928.
U.S. Official Action dated Jan. 28, 2008 cited in U.S. Appl. No. 10/836,154.
U.S. Official Action dated Feb. 20, 2008 cited in U.S. Appl. No. 10/848,774.
U.S. Official Action dated Feb. 21, 2008 cited in U.S. Appl. No. 10/851,442.
U.S. Official Action dated Apr. 15, 2008 cited in U.S. Appl. No. 10/955,942.
U.S. Official Action dated Apr. 16, 2008 cited in U.S. Appl. No. 10/955,967.
U.S. Official Action dated Apr. 29, 2008 cited in U.S. Appl. No. 10/955,941.
U.S. Official Action dated May 28, 2008 cited in U.S. Appl. No. 10/982,073.
U.S. Official Action dated May 30, 2008 cited in U.S. Appl. No. 11/430,562.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Jul. 17, 2008 cited in U.S. Appl. No. 10/955,940.
U.S. Official Acton dated Nov. 13, 2008 cited in U.S. Appl. No. 11/430,562.
U.S. Official Action dated Nov. 25, 2008 cited in U.S. Appl. No. 11/154,278.
U.S. Official Action dated Dec. 11, 2008 cited in U.S. Appl. No. 10/982,073.
U.S. Official Action dated Dec. 23, 2008 cited in U.S. Appl. No. 10/955,942.
U.S. Official Action dated Dec. 24, 2008 cited in U.S. Appl. No. 10/955,967.
U.S. Official Action dated Jan. 6, 2009 cited in U.S. Appl. No. 10/955,941.
U.S. Official Action dated Jan. 9, 2009 cited in U.S. Appl. No. 11/430,561.
U.S. Official Action dated Mar. 18, 2009 cited in U.S. Appl. No. 11/401,470.
U.S. Official Action dated Apr. 7, 2009 cited in U.S. Appl. No. 10/955,940.
U.S. Official Action dated Apr. 28, 2009 cited in U.S. Appl. No. 12/028,797.
U.S. Official Acton dated Jun. 19, 2009 cited in U.S. Appl. No. 11/430,562.
U.S. Official Action dated Aug. 4, 2009 cited in U.S. Appl. No. 10/955,967.
U.S. Official Action dated Aug. 4, 2009 cited in U.S. Appl. No. 10/955,942.
U.S. Official Action dated Aug. 17, 2009 cited in U.S. Appl. No. 11/430,561.
U.S. Official Action dated Aug. 18, 2009 cited in U.S. Appl. No. 11/782,059.
U.S. Official Action dated Sep. 15, 2009 cited in U.S. Appl. No. 11/217,071.
U.S. Official Action dated Sep. 23, 2009 cited in U.S. Appl. No. 11/401,470.
U.S. Official Action dated Nov. 13, 2009 cited in U.S. Appl. No. 11/154,278.
U.S. Official Action dated Nov. 24, 2009 cited in U.S. Appl. No. 11/445,393.
U.S. Official Action dated Dec. 9, 2009 cited in U.S. Appl. No. 12/028,797.
U.S. Official Action dated Dec. 10, 2009 cited in U.S. Appl. No. 10/955,940.
U.S. Official Action dated Jan. 6, 2010 cited in U.S. Appl. No. 10/607,020.
U.S. Official Acton dated Jan. 7, 2010 cited in U.S. Appl. No. 11/430,562.
U.S. Official Action dated Jan. 20, 2010 cited in U.S. Appl. No. 10/955,967.
U.S. Official Action dated Jan. 25, 2010 cited in U.S. Appl. No. 10/982,073.
U.S. Official Action dated Feb. 18, 2010 cited in U.S. Appl. No. 11/782,059.
U.S. Official Action dated Feb. 19, 2010 cited in U.S. Appl. No. 10/955,942.
U.S. Official Action dated Feb. 22, 2010 cited in U.S. Appl. No. 11/401,470.
U.S. Official Action dated Mar. 30, 2010 cited in U.S. Appl. No. 11/217,071.
U.S. Official Action dated Apr. 15, 2010 cited in U.S. Appl. No. 11/823,999.
U.S. Official Action dated May 5, 2010 cited in U.S. Appl. No. 10/851,506.
U.S. Official Action dated May 25, 2010 cited in U.S. Appl. No. 10/607,020.
U.S. Official Action dated Jun. 3, 2010 cited in U.S. Appl. No. 12/028,797.
U.S. Official Acton dated Jun. 22, 2010 cited in U.S. Appl. No. 11/430,562.
U.S. Official Action dated Jun. 23, 2010 cited in U.S. Appl. No. 10/955,940.
U.S. Official Action dated Jul. 1, 2010 cited in U.S. Appl. No. 11/782,059.
U.S. Official Action dated Jul. 6, 2010 cited in U.S. Appl. No. 10/955,967.
U.S. Official Action dated Aug. 2, 2010 cited in U.S. Appl. No. 10/955,942.
U.S. Official Action dated Aug. 6, 2010 cited in U.S. Appl. No. 11/401,470.

(56) References Cited

OTHER PUBLICATIONS

U.S. Official Action dated Sep. 21, 2010 cited in U.S. Appl. No. 11/217,071.
U.S. Official Action dated Sep. 27, 2010 cited in U.S. Appl. No. 10/836,154.
Mexican Office Action dated Jan. 22, 2013 cited in Appln No. MX/a/2008/003342.
Mexican Office Action dated Mar. 22, 2013 in Appln No. PA/a/2005/008350.
EP Search Report dated May 10, 2013 cited in Appln No. PCT/US2009/044292.
Russian Office Action dated May 13, 2013 cited in Appln No. 2010-151922.
Korean Final Notice of Preliminary Rejection dated May 20, 2013 cited in Appln No. 10-2008-7005939.
Chinese Notice on Third Office Action dated Jun. 5, 2013 cited in Appln No. 200980124644.9.
Mexican Office Action dated Jun. 11, 2013 in Appln No. PA/a/2005/008351.
Mexican Office Action dated Jun. 20, 2013 in Appln No. MX/a/2010-014056.
U.S. Official Action dated Jun. 3, 2013 in U.S. Appl. No. 13/102,622, 29 pgs.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2013 in U.S. Appl. No. 12/142,927, 42 pgs.
The Discussion Board Component of Blackboard: An Instructor's Guide; Aug. 2004; 23 pgs.
Hock, "Yahoo! to the Max"; May 10, 2005; 5 excerpted pgs.
Homeworking Forum; archived Dec. 6, 2014; 11 pgs.
Gina Danielle Venolia et al., Supporting Email Workflow, revised Dec. 2001; 11 pgs.
Mock et al., "An Experimental Framework for Email Categorization and Management", Sep. 9-12, 2001, 3 pgs.
Yang, "Email Categorization Using Fast Machine Learning Algorithms", 2002, 8 pgs.
Islam et al., "Email Categorization Using Multi Stage Classification Technique", 2007, 3 pgs.
"Preview Pane in Conversation: 4 pane view", 2005, Zinbra, Inc., 3 pgs.
"Reading Pane in Conversation View", retrieved at <<http://www.zimbra.com/forums/users/5918-reading-pane-conversation-view.html>>, 5 pgs.
U.S. Official Action dated Jul. 1, 2014 in U.S. Appl. No. 12/372,386, 93 pgs.
U.S. Official Action dated Jul. 30, 2014 in U.S. Appl. No. 13/102,633, 36 pgs.
Taiwan Search Report dated May 7, 2014 cited in Appln No. 098117357, 13 pgs.
Japanese Notice of Allowance Issued in Patent Application No. 2011-550149, Mailed Date: May 8, 2014, Filed Date: Jan. 22, 2010, 4 Pages.
Australian Second Office Action Issued in Patent Application No. 2010216342, Mailed Date: May 12, 2014, Filed Date: Jan. 22, 2010, 3 Pages.
Taiwan Search Report dated May 12, 2014 cited in Appln No. 098119245, 11 pgs.
Notice of Allowance Issued in Chinese Patent Application No. 200680032789.2, Mailed Date: May 15, 2014, Filed Date: Sep. 8, 2006, 3 Pages.
Russian Decision on Grant dated May 20, 2014 in Appln No. 2011145984/08, 24 pgs.
Japanese Final Decision of Rejection dated May 27, 2014 in Appln No. 2012-110939, 4 pgs.
EP Search Report dated Jun. 2, 2014 in Appln No. PCT/US2010/034277, 6 pgs.
EP Communication dated Jun. 2, 2014 in Appln No. 07 795 391.7, 9 pgs.
Chilean Second Office Action dated Jun. 6, 2014 in Appln No. 1987-2011, 12 pgs.
Russian Decision on Grant dated Jul. 20, 2014 in Appln No. 2010138162, 14 pgs.—No English Language Translation.
U.S. Official Action dated May 14, 2014 in U.S. Appl. No. 13/615,668, 34 pgs.
U.S. Official Action dated Jun. 2, 2014 in U.S. Appl. No. 12/144,642, 32 pgs.
U.S. Appl. No. 11/151,686, filed Jun. 13, 2005 entitled "Floating Command Object".
U.S. Appl. No. 12/163,758, filed Jun. 27, 2008 entitled "Communication Between a Document Editor-in-Space User Interface and a Document Editor Out-Space User Interface".
U.S. Appl. No. 12/163,784, filed Jun. 27, 2008 entitled "Exposing Non-Authoring Features Through Document Status Information in an Out-Space User Interface".
U.S. Appl. No. 11/445,393, filed Jun. 1, 2006 entitled "Modifying a Chart".
U.S. Appl. No. 12/028,797, filed Feb. 11, 2008 entitled "Side-by-Side Shared Calendars".
U.S. Appl. No. 11/430,561, filed May 9, 2006 entitled "Integrated Search and Find User Interface".
U.S. Appl. No. 11/430,562, filed May 9, 2006 entitled "Expanded Search and Find User Interface".
U.S. Appl. No. 11/430,416, filed May 9, 2006 entitled "Search and Find Using Expanded Search Scope".
U.S. Appl. No. 12/954,952, filed Nov. 29, 2010 entitled "Gallery User Interface Controls".
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Halvorson et al., Microsoft Office Professional Official Manual, Aug. 20, 2002, 10 pgs.
Bellavista et al., "A Mobile Infrastructure for Terminal User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems," Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/.
Australian Office Action dated Apr. 30, 2014 in Appln No. 2010247882, 3 pgs.
Gordon Padwick, Using Microsoft Outlook 2000, Que, Sp. Ed., May 1999, 5 pp.
Goldberg et al., "Using Collaborative Filtering to Weave an Information Tapestry," Communication of the ACM, vol. 35, No. 12, pp. 61-70, Dec. 1992.
Liu et al., "Continual Queries for Internet Scale Event-Driven Information Delivery," IEEE Transactions on Knowledge and Data Engineering, vol. 11, Issue 1, pp. 610-628, 1999.
Chen et al., "NiagaraCQ: A Scalable Continuous Query System for Internet Databases," Int. Conf. on Management of Data, Proc. of the 2000 ACM SIGMOD Int Conf. on Management of Data, pp. 379-390, 2000.

(56) References Cited

OTHER PUBLICATIONS

Marshall School of Business: "Workshop IV—Calendar," http://www.marshall.nsc.edu/computing/PDF_Files/Outlook/Workshop4, PDF, Apr. 10, 2000, pp. 1-4.
Canadian Office Action dated Jul. 30, 2014 cited in Appln No. 2,512,155, 8 pgs.
Canadian Office Action dated Jul. 30, 2014 cited in Appln No. 2,512,102, 7 pgs.
Chinese Third Office Action dated Aug. 12, 2014 cited in Appln No. 200780020312.7, 13 pgs.
Mexican Office Action dated Aug. 14, 2014 cited in Appln No. PA/a/2005/008349, 18 pgs.
Ringel et al., "Automated Message Prioritization: Making Voicemail Retrieval More Efficient"; In CHI'02 Extended Abstracts on Human Factors in Computing Systems; Apr. 20, 2002; pp. 592-593.
Kumar et al., "A personal agent application for the semantic web"; In AAAI Fall Symposium on Personalized Agents; 2002; pp. 1-8.
Gorniak, Peter; "Sorting email messages by topic"; 1998; 1 pg.
Maes et al., "Learning Interface Agents"; In AAAI (vol. 93); 1993; pp. 459-465.
Mexican Office Action Received in Patent Application No. MX/a/2010/013566, Mailed Dated: Jun. 12, 2013, 3 Pages.
Israeli Office Action Received in Patent Application No. 209011, Mailed Dated: Sep. 10, 2013, 5 Pages.
Malaysian Notice of Allowance Received in Patent Application No. PI 20080400, Mailed Date: Sep. 13, 2013, Filed Date: Aug. 29, 2006, 2 Pages.
Notice of Allowance Received for Korea Republic of (KR) Patent Application No. 10-2008-7005939, Mailed Date: Nov. 20, 2013, Filed Date: Sep. 12, 2006, 2 Pages.
Japanese Office Action Issued in Patent Application No. 2011-550149, Mailed Date: Jan. 20, 2014, Filed Date: Jan. 22, 2010, 5 Pages.
Russian Notice of Allowance Issued in Patent Application No. 2010152843, Mailed Date: Feb. 20, 2014, 16 Pages.
Israeli Office Action dated Feb. 28, 2014 in Appln No. 209012, 6 pgs.
Australian Office Action Issued in Patent Application No. 2010216342, Mailed Date: Mar. 14, 2014, Filed Date: Jan. 22, 2010, 3 Pages.
Mexican Office Action Received for Mexican Patent Application No. PA/a/2005/008349, Mailed Date: Mar. 14, 2014, Filed Date: Aug. 5, 2005, 12 Pages.
Mexican Notice of Allowance Received in Patent Application No. MX/a/2008/002889, Mailed Date: Apr. 1, 2014, Filed Date: Aug. 29, 2006, 1 Page.
Chilean Office Action Received in Patent Application No. 2804-2011, Mailed Date: Apr. 4, 2014, 7 Pages.
Russian Notice of Allowance Issued in Patent Application No. 2011134380, Mailed Date: Apr. 5, 2014, Filed Date: Jan. 22, 2010, 22 Pages.
Australian Notice of Allowance Received for Australia Patent Application No. 2009262833, Mailed Date: Apr. 16, 2014, Filed Date: Jun. 5, 2009, 2 Pages.
U.S. Official Action dated Sep. 10, 2014 in U.S. Appl. No. 12/954,952, 52 pgs.
U.S. Official Action dated Sep. 11, 2014 in U.S. Appl. No. 13/427,939, 133 pgs.
U.S. Official Action dated Sep. 30, 2014 in U.S. Appl. No. 13/595,084, 185 pgs.
U.S. Official Action dated Aug. 25, 2014 in U.S. Appl. No. 13/102,633, 117 pgs.
Microsoft Office XP/2002, Wikipedia, http://en.wikipedia.org/wiki/Microsoft_Office_XP, May 31, 2001; 3 pgs.
Canadian Office Action dated Sep. 4, 2014 in Appln No. 2,512,036, 3 pgs.
Chinese Office Action dated Sep. 15, 2014 in Appln No. 201210079579.6, 11 pgs.
Canadian Office Action dated Sep. 30, 2014 in Appln No. 2,617,182, 3 pgs.
Chinese Decision on Reexamination dated Nov. 18, 2014 in Appln. No. 200910148820.4, 15 pgs.
Embedding and Linking Excel Worksheets into Word; 2001, The McGraw-Hill Companies, Inc, 6 pgs.
U.S. Official Action dated Dec. 24, 2014 in U.S. Appl. No. 13/102,633, 42 pgs.
Akamatsu, "Touch with a Mouse, A Mouse Type Interface Device with Tactile and Force Display"; © IEEE; 1995; 5 pgs.
U.S. Official Action dated Sep. 18, 2014 in U.S. Appl. No. 11/782,059, 41 pgs.
U.S. Official Action dated Oct. 10, 2014 in U.S. Appl. No. 11/332,822, 47 pgs.
U.S. Official Action dated Oct. 24, 2014 in U.S. Appl No. 13/615,668, 35 pgs.
U.S. Official Action dated Nov. 28, 2014 in U.S. Appl. No. 13/437,031, 100 pgs.
Chilean Office Action dated Oct. 24, 2014 in Appln No. 2804-2011, 5 pgs. (w/o English Translation).
Israel Office Action Issued in Patent Application No. 169717, Mailed Date: Oct. 29, 2014, 1 Page; (w/o English Translation).
Norwegian Office Action dated Nov. 29, 2014 in Appln No. 20053658 4 pgs.
Norwegian Office Action dated Nov. 29, 2014 in Appln No. 20053655, 3 pgs.

\* cited by examiner

FLOATING COMMAND OBJECT

RELATED APPLICATIONS

This application is a Continuation of co-pending U.S. application Ser. No. 11/151,686 entitled "Floating Command Object" filed Jun. 13, 2005, which claims priority to U.S. Provisional Application No. 60/601,815 filed Aug. 16, 2004 entitled "Improved User Interfaces for Computer Software Applications, which are incorporated herein by reference.

BACKGROUND

With the advent of the computer age, computer and software users have grown accustomed to user-friendly software applications that help them write, calculate, organize, prepare presentations, send and receive electronic mail, make music, and the like. For example, modem electronic word processing applications allow users to prepare a variety of useful documents. Modern spreadsheet applications allow users to enter, manipulate, and organize data. Modem electronic slide presentation applications allow users to create a variety of slide presentations containing text, pictures, data or other useful objects. Modern database applications allow users to store, organize and exchange large amounts of data.

In a typical setting, users enter and edit text or data in documents or files generated with such applications, for example, memoranda, spreadsheets, slide presentations, database files, and the like. During text or data entry, or during subsequent editing of text or data, users often apply various properties, such as formatting properties, to text or data. For example, in a given paragraph in a school term paper, a student may desire to boldface a word, italicize a word or number, change the font properties on a text or data entry, and the like. Indeed, the vast majority of tool selection during text/data entry and editing comes from simple text formatting commands like boldface, italics and font.

The traditional location of buttons or controls for selecting these types of commands is in a toolbar located along an edge of a user interface being used to enter and edit the text or data. Selecting commands from such statically located toolbars is inefficient because the user must first select a text, data or other object in the document and then move an electronic pointer, for example, a mouse pointer, to the desired command button or control in the toolbar to select the desired command. The user must then move the pointer back to the editing position in the document for making additional edits, if desired.

Pop-up contextual menus are available for deploying near a text/data entry or editing point. Such contextual menus typically require a secondary selection, such as a right mouse click, for deploying the menu, and such contextual menus typically contain many different functionality controls or buttons in addition to the simple formatting functions most commonly and frequently used on selected objects. Also, when a user selects a given command from such contextual menus, the deployed menu typically closes after the selection. If the user desires additional functionality from the contextual menu, the contextual menu must be re-deployed by the user.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention are directed to a floating command object (hereafter "floating object") (also known as a "floatie") that contains a small set of functions that are relevant to a selected object. The floating object dynamically deploys in a document in close proximity to an entry/editing point upon the selection of a text, data or other object. According to embodiments of the present invention, the floating object deploys in a consistent location relative to a selected object each time it is deployed. Alternatively, if available display space does not allow the floating object to deploy in a consistent location for a given deployment, or if deployment in a given location will cover a displayed object that should remain visible, the floating object may be displayed in a different location.

The floating object typically contains only a set of commands that are relevant to the currently selected object. The commands contained in the floating object are those that modify the selected object without requiring the opening of additional functionality user interfaces. According to an embodiment, the commands contained in the floating object may be customized by a user.

The floating object of the present invention may be deployed from other user interfaces such as contextual menus. However, unlike contextual menus, selection of a given command from the floating object does not close the floating object. The floating object remains deployed to allow multiple functionality selections, for example, boldface selection followed by font size selection followed by color selection. Once a user is finished with the floating object it may be closed by the user. According to embodiments, the floating object is a lightweight display object in that it is dismissed from display when it detects that a user no longer requires its functions.

According to an embodiment of the invention, the opacity of the displayed floating object is a function of the distance between the electronic pointer and the position of the displayed floating object. As an electronic pointer, for example, mouse pointer, is moved away from the displayed floating object, the displayed floating object becomes gradually more translucent so as to visually deemphasize the importance of the floating object to the changing position of the pointer.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to a floating command object (hereafter "floating object" or "command object") that provides a small set of commonly and frequently used functionality commands in close proximity to a text or data entry/editing point. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
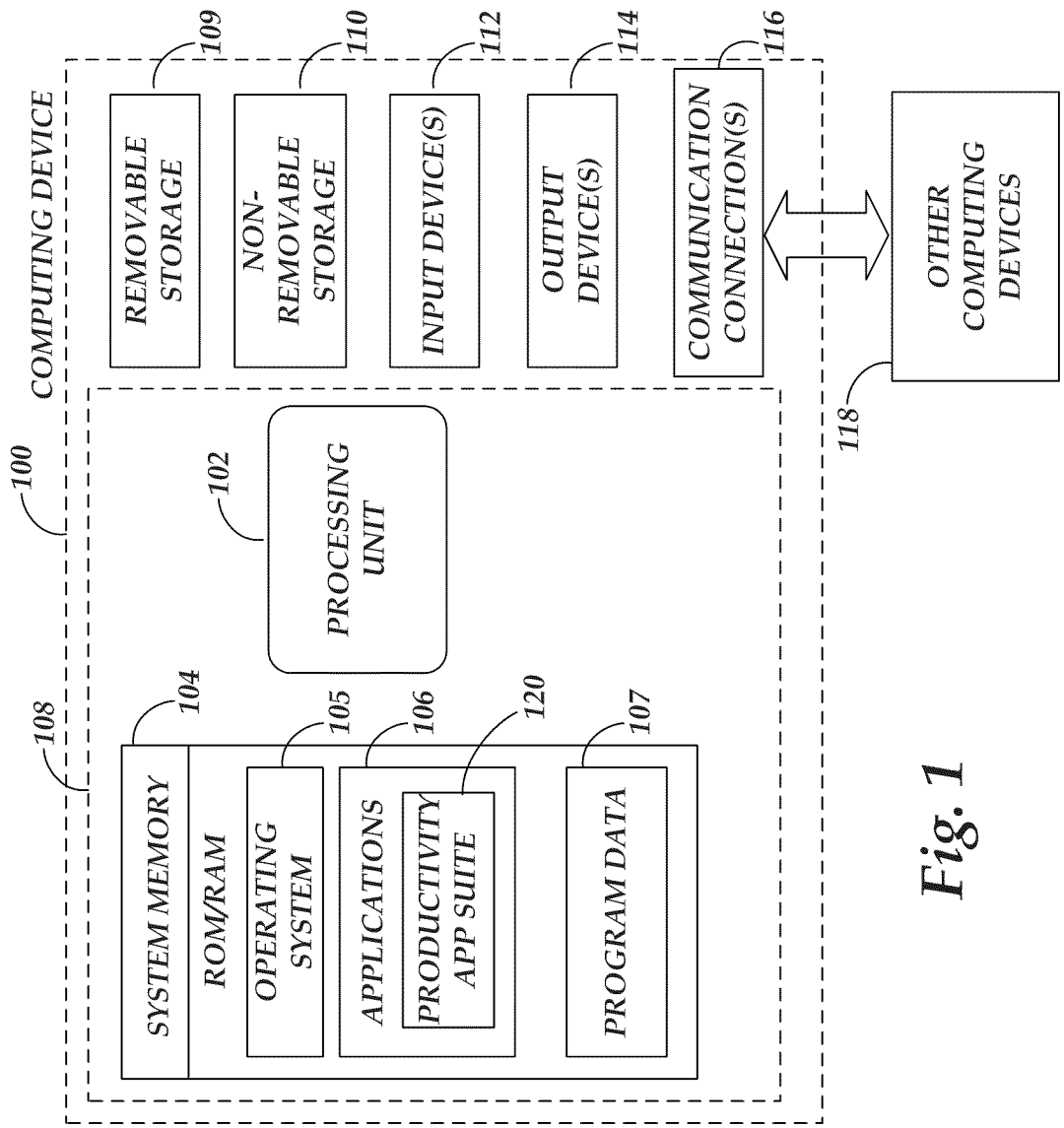
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS operating systems from MICROSOFT CORPORATION of Redmond, Wash. The system memory 104 may also include one or more software applications 106, and may include program data 107. This basic configuration is illustrated in FIG. 1 by those components within dashed line 108.

In one embodiment, the application 106 may comprise many types of programs, such as an electronic mail program, a calendaring program, an Internet browsing program, and the like. According to an embodiment of the present invention, a multiple-functionality software application 120 is illustrated for providing many types of functionalities. The multiple-functionality application 120 may include a number of program modules, such as a word processing program, a spreadsheet program, a slide presentation program, a database program, and the like. An example of such a multiple-functionality application 120 is OFFICE manufactured by MICROSOFT CORPORATION.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
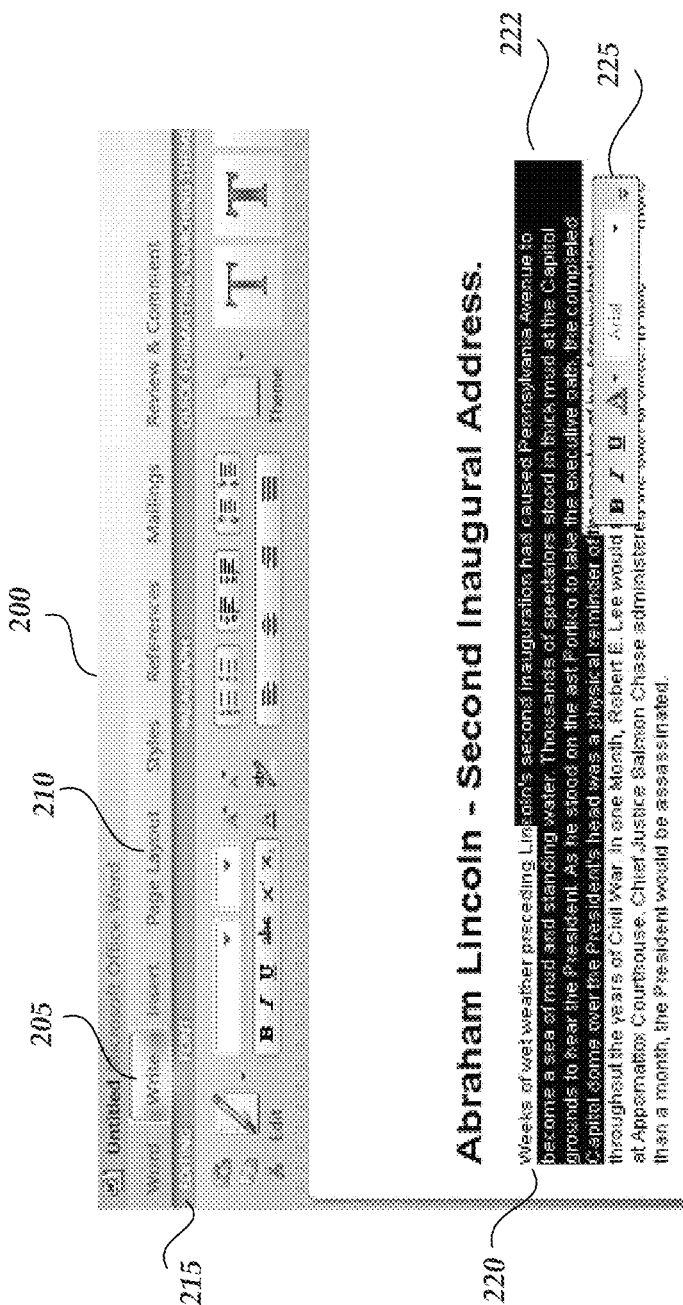
FIG. 2 illustrates a computer screen display of an example word processing user interface showing a floating object in proximity to a selected text object.

FIG. 2 illustrates a computer screen display of an example word processing user interface showing a floating object in proximity to a selected text object. As illustrated in FIG. 2, a user interface 200 of an example word processing application is provided for entering and editing a text selection 220. The user interface 200 includes a variety of task-related controls such as the writing tab 205, the page layout control 210, the insert tab, the styles tab, etc. A command bar or ribbon 215 is provided underneath the task-related controls for providing a number of functionality controls related to a selected task-related control. For example, the command ribbon 215 illustrated in FIG. 2 includes a number of functionality controls related to the writing tab 205. As should be appreciated by those skilled in the art, the user interface 200 illustrated in FIG. 2 is for purposes of example only and is not restrictive of the numerous types and layouts of user interfaces that may be used according to embodiments of the present invention. For example, the user interface 200 is illustrative of a user interface for other software applications such as spreadsheet applications, slide presentation applications, database applications, desktop publishing applications, and the like.

Referring still to FIG. 2, a portion 222 of the text selection 220 has been selected for some type of text editing, for example, the application of formatting properties to the selected text. As is well known to those skilled in the art, a text selection, such as the portion of text 222, may be selected for editing by placing a pointing device, such as a mouse pointer, at a desired location in a document. Once the pointing device is selected, for example, mouse or touch pad click, an insertion point is established in the text selection. A portion of text 222 may be selected for editing by dragging the pointer over the desired portion 222. As should be appreciated, other suitable means for selecting a portion of text or other object for editing may be used according to embodiments of the invention, for example, double mouse-clicking after location of a pointing device. Once the portion of text or other object is selected, various functionalities may be applied to the selected portion of text or object, for example, formatting property application, cut/copy/move operations, etc.

Once a portion 222 of text is selected for some type of editing, the floating object 225 automatically deploys over the document in close proximity to the selected object. As should be appreciated, deployment of the floating object 225 for the selected text object illustrated in FIG. 2 is for purposes of example only. The floating object of the present invention may be automatically deployed in proximity to a variety of selected objects. For example, the floating object may be deployed for providing functionality in association with text objects, image objects, data objects, etc. In addition, the floating command object 225 may be deployed as an opaque object, as illustrated in FIG. 3, or alternatively, the floating object may be deployed in a semi-transparent manner.

According to embodiments of the present invention, the floating object 225 is displayed in a consistent location relative to the pointer location in the selected object. For example, the floating object may always be displayed immediately above a selected object, immediately beneath a selected object, immediately to the right of a selected object, or immediately to the left of a selected object in close proximity to the final position of the pointer during object selection. By displaying the floating object 225 in consistent locations relative to a selected object and relative to the pointer, predictability is developed which allows the user to be very efficient in using the floating object. For example, if a user learns that the floating object always deploys immediately beneath and to the right of the pointer and selected object, the user will develop muscle memory that allows the user to successfully move the pointer into the deployed floating object without excess thought or excess physical movement. As should be appreciated, depending on the location of the pointer and selected object, the location of the floating object may be deployed in a slightly different location from a normal location. For example, if the floating object is normally deployed immediately beneath and to the right of the pointer and selected object, and the pointer is located in a position that does not allow space for deploying the floating object in the usual location, the floating object may be deployed in a different location, for example, above and to the left of the pointer and selected object.

Figure 3:
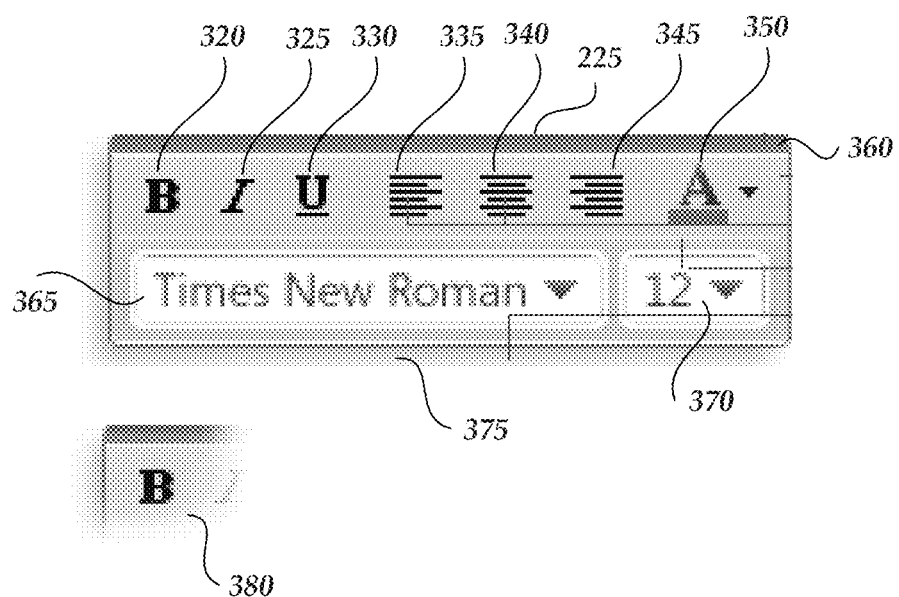
FIG. 3 illustrates a computer screen display of a floating object according to embodiments of the present invention.

Referring now to FIG. 3, according to embodiments of the present invention, the floating object 225 contains a subset of commands available from the software application in use that are contextually relevant to the current selection. For example, the floating object 225 illustrated in FIG. 3 contains commands relevant to applying formatting properties to a selected text object. For example, the floating object 225 includes a boldface command 320, an italics command 325, an underlining command 330, a left text justified command 335, a centered text command 340, a right text justified command 345, a color command 350, a font type command 365 and a font size command 370. As should be appreciated, selection of a command such as the font type command 365 may cause a drop-down menu that is deployed beneath the floating object 225 for allowing selection of one of a number of font styles. Similarly, selection of the font size command 370 may cause a drop-down menu to allow selection of one of a number of different font sizes. In addition, the commands typically included in the floating object 225 are only those commands that allow for modification of the selected object without requiring the user to launch or display a secondary user interface.

As should be appreciated, if the floating object 225 is deployed relative to a different type of object, for example, a picture object, the floating object may have a different set of commands, for example, commands commonly and frequently used for applying formatting or editing properties to a selected picture object. Likewise, a floating object 225 deployed in response to the selection of a table object in a spreadsheet document may be populated with commands commonly and frequently used for editing or applying formatting properties to data contained in a table object.

In order to prevent the floating object 225 from occupying too much space on the associated user interface 200, selectable controls inside the floating object may be made as small as possible. The visual representations of controls in the floating object preferably closely resemble corresponding visual controls contained in the command bar or ribbon 215 illustrated in FIG. 2. The floating object handle 316 allows for dragging the floating object to a different location in a document. For example, if the floating object is displayed over a portion of text or data, and the user needs to see the text or data covered by the floating object, the user may drag the floating object to a different location to uncover the text or data.

Referring still to FIG. 3, according to another embodiment, a floating object masking control 380 may be deployed upon initial selection of a text or data object before display of the entire floating object 225. Display of the masking control 380 informs a user of the presence and availability of the floating object 225 without actually displaying the floating object 225. According to this embodiment, if the user desires a display of the entire floating object 225, the user may select the masking control 380, and the entire floating object 225 will be displayed, as illustrated in FIGS. 2 and 3. As with the entire floating object 225, the masking control 380 will be displayed in a consistent location in close proximity to the pointer and selected object.

Figure 4:
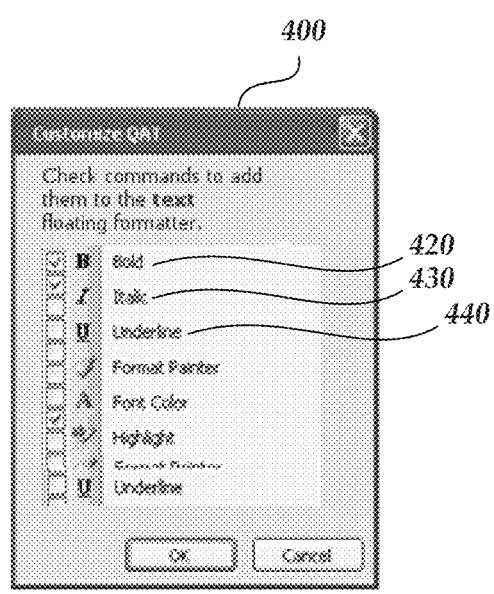
FIG. 4 illustrates a computer screen display of a user interface for customizing functionality controls contained in a floating object.

FIG. 4 illustrates a computer screen display of a user interface for customizing functionality commands contained in the floating object. According to embodiments of the present invention, the individual commands displayed in the floating object 225 may be customized by a user. The dialog 400 is presented with which a user may select particular functionality commands that will be populated in the floating object 225 when the object is subsequently deployed. For example, if a given user only frequently uses the bold function, the italics function and the underline function, a user may customize the floating object 225 to only have those commands in the floating object. On the other hand, if a different user uses the font color command on a frequent basis, the font color command may be checked from the checklist in the dialog 400 for adding that command to the floating object 225.

Figure 5:
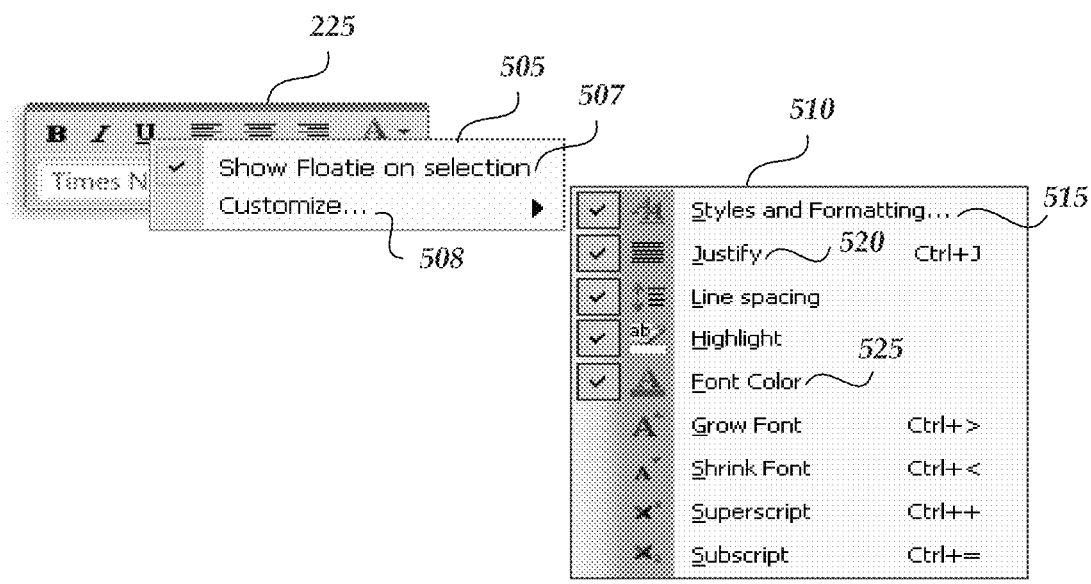
FIG. 5 illustrates a computer screen display of a user interface for controlling display of and for customizing functionality controls contained in a floating object.

Referring to FIG. 5, according to another embodiment, a pop-out dialog 505 may be deployed for enabling or disabling the floating object 225 by selecting the "show floatie on selection" control 507. That is, by de-selecting the "show floatie on selection" control 507, the floating object 225 will be disabled from subsequent deployment. Additionally, the "customize" control 508 may be selected to display a pop-out menu 510 from which a user may select commands from a list of available commands that will be populated in the floating object 225 upon subsequent deployment.

If a user selects a very limited set of commands for populating the floating object 225, the size of the floating object 225 may be reduced when it is displayed. According to one embodiment, if the combined contents of the floating object are narrower than a prescribed width, for example, 200 pixels, the floating object may be rendered as a single-line object, as opposed to the two-line object illustrated in FIGS. 2 and 3. On the other hand, if a given user adds functionality commands to the floating object 225 such that the object exceeds a prescribed width, for example, 200 pixels, then the contents of the floating object may be wrapped to a second line as illustrated in FIGS. 2 and 3. If additional commands are added to the floating object requiring more than two lines of content, additional lines of content may be dynamically added.

Figure 6:
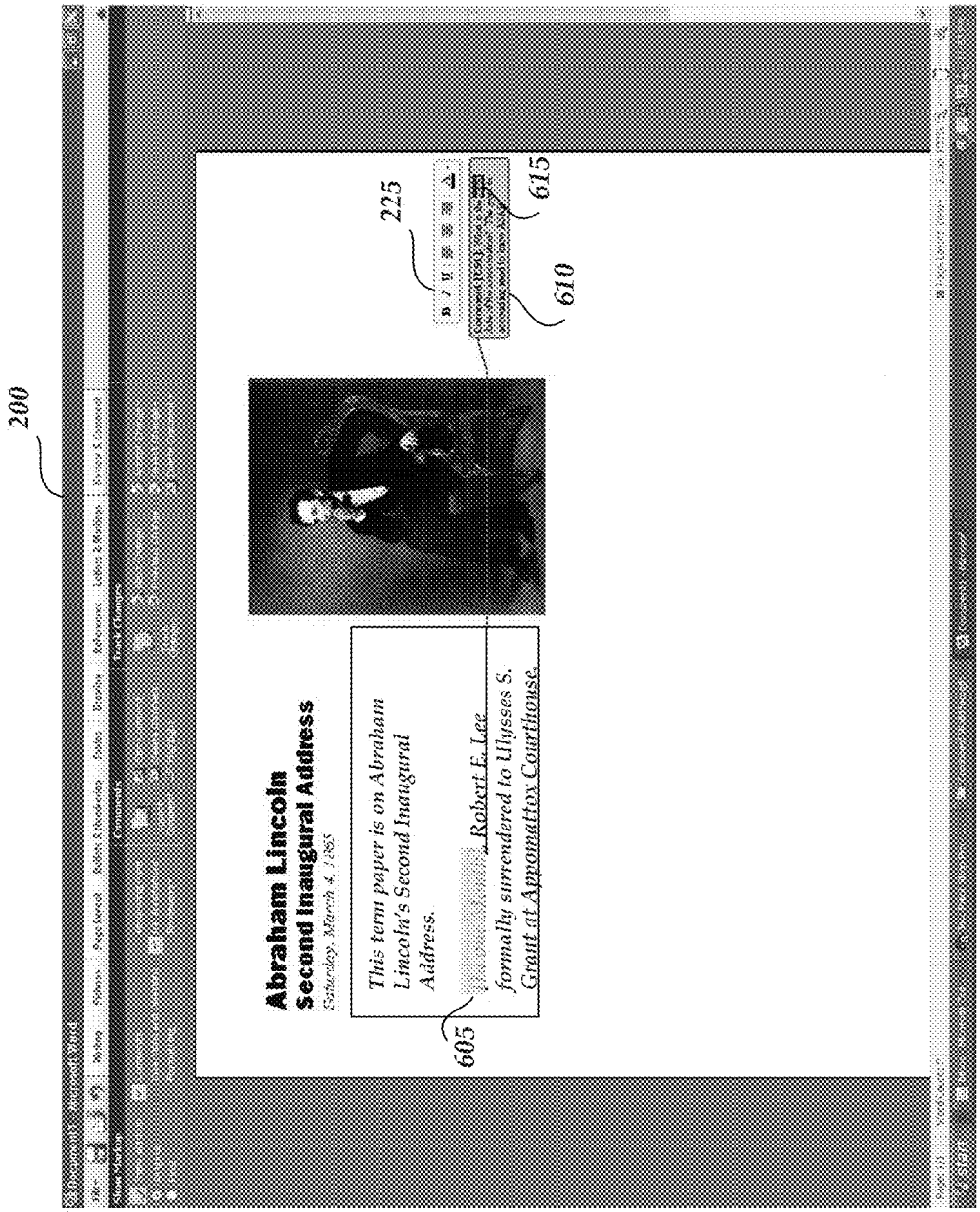
FIG. 6 illustrates a computer screen display showing the use of a floating object for editing a comment applied to a word processing document.

According to embodiments of the present invention, the floating object 225 may be deployed at any location in a document at which a user may place a cursor or pointer for selecting an object for editing. For example, FIG. 6 illustrates a computer screen display showing the use of a floating object for editing a comment applied to a word processing document. As illustrated in FIG. 6, a comment function is in use for adding a comment 610 to a text selection 605 in a word processing document. If a user selects a text or data object 615 in the comment 610, the floating object 225 may be deployed in close proximity to the pointer position in the comment 610 for allowing formatting or other properties to be applied to the selected object in the comment 610.

Figure 7:
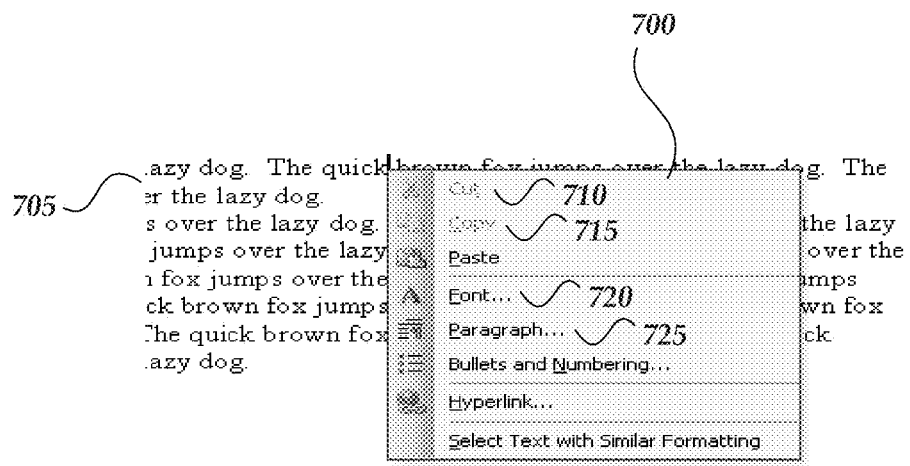
FIG. 7 illustrates a computer screen display showing the selection of floating object functions from a deployed contextual menu.

Referring now to FIG. 7, a context menu 700 is illustrated relative to a text selection 705. As is known to those skilled in the art, a context menu may be deployed relative to a selected object for providing various functionalities for application to the selected object. The example context menu 700 may be deployed through some user action, for example, right-clicking on a mouse device, after selection of a given text, data or other object. According to typical context menus, selection of a given command from the context menu causes the associated functionality to be applied to the selected object and causes a simultaneous closing of the context menu 700.

According to embodiments of the present invention, if a user selects a command from the context menu 700 that is available in the floating object for the selected object, the functionality associated with the selected command is applied to the selected object, and simultaneously, the floating object containing the selected command will be displayed, and the contextual menu 700 will be closed. By displaying the floating object 225 in response to selecting a command from the contextual menu 700, the user is provided other related formatting functions, for example, boldfacing, italics, and the like, available in the floating object 225 that the user will have grown accustomed to seeing in the floating object 225 in association with the command selected by the user from the contextual menu 700. Once the floating object is deployed by selecting a command from the contextual menu 700, the floating object is positioned and performs in the same manner as described above.

Figure 8:
FIG. 8 illustrates a computer screen display showing the use of a floating object for applying properties to a database entry.

As briefly described above, floating objects 225 may be utilized with respect to a variety of software applications, for example, word processing applications, spreadsheet applications, slide presentation applications, database applications, desktop publishing applications, and the like. For example, referring to FIG. 8, utilization of a floating object in the context of a database application is illustrated. As shown in FIG. 8, a user interface 800 for a database application is provided. A toolbar 810 provides a number of commands for obtaining functionalities available from the associated database application. According to embodiments of the present invention, a floating object 830 is displayed in close proximity to a selected data object 820. As should be appreciated, the commands populating the floating object 830 may include additional or different commands commonly used for selected objects in the database user interface. For example, instead of the commands illustrated in the floating object 830, other commands related to database applications, for example, filtering commands and sorting commands, may be populated in the floating object 830 by default or by customization, as described above with reference to FIGS. 4 and 5.

According to embodiments of the present invention, when the floating object 225, 830 is deployed by selection of an object for editing, the floating object 225, 830 remains displayed in proximity to the selected object until the floating object is dismissed by user action. That is, once the user has utilized all desired commands from the floating object, the user may selectively close the display of the floating object. Closing the floating object is made a relatively easy operation for the user. If the user moves the mouse pointer away from the floating object more than a prescribed distance, the floating object is closed. Similarly, if the user moves the pointer or cursor to a different location in the document and selects, for example, mouse clicks, at a different location, the floating object is dismissed from its present location and is redeployed at the new location, if applicable. Additionally, if a user utilizes a scrolling mechanism on the mouse device or touchpad, or if the user enters additional text or data through typing, voice recognition, or other mechanism, the floating object is dismissed.

Figure 9:
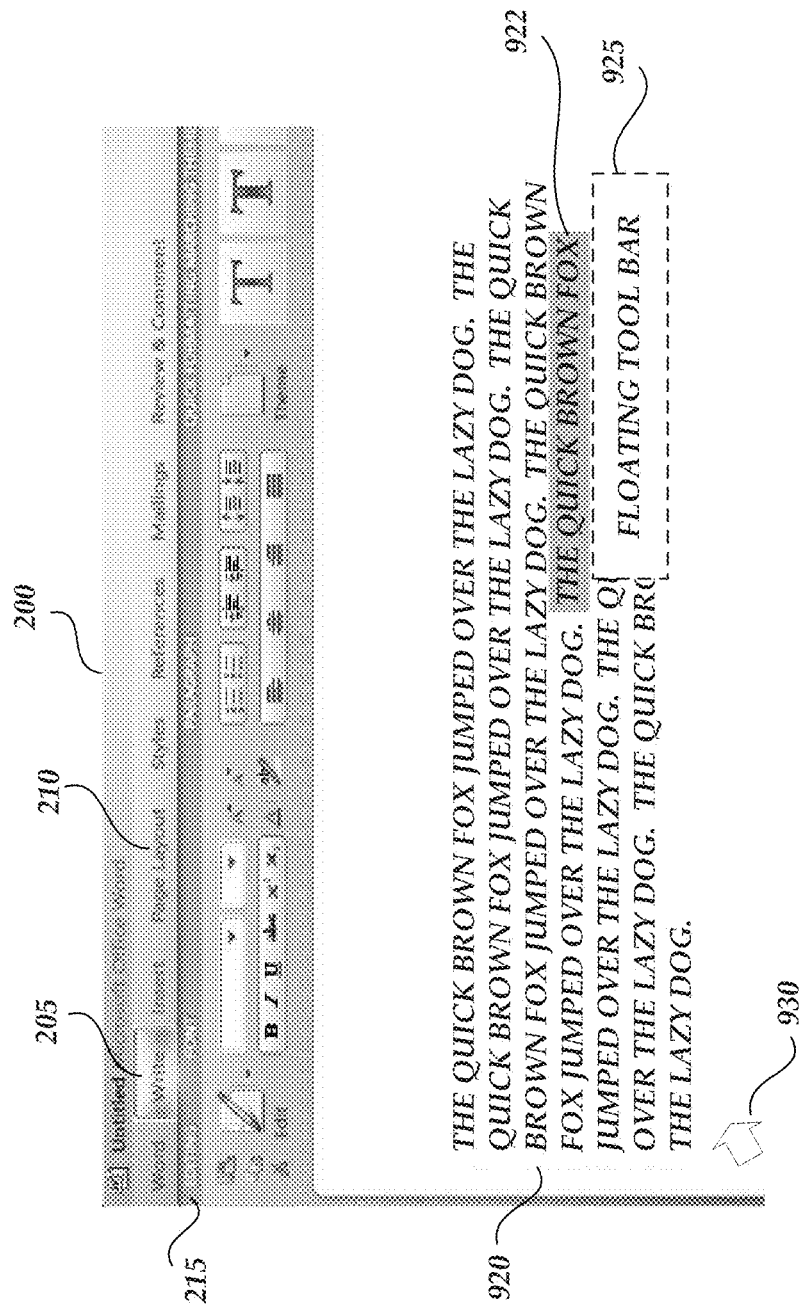
FIG. 9 illustrates a computer screen display showing the translucent display of a floating object as an electronic pointer is moved away from the displayed floating object.

As illustrated in FIGS. 2 and 3 above, the visual presentation of the floating object 225 is an opaque display that covers underlying text or data when the floating object is displayed in a given user interface 200, 800. However, according to embodiments of the present invention, the opacity of the visual display of the floating object 225, 830 is a function of the distance between the displayed floating object and the mouse or touchpad pointer. As illustrated in FIG. 9, a floating object 925 is displayed in proximity to a text selection 920 for applying one or more functions, for example, formatting properties, to the selected text object 922. As the mouse pointer 930 is moved away from the floating object 925, the display of the floating object 925 gradually becomes increasingly translucent. If the pointer is moved a prescribed distance away from the displayed floating object, the floating object 925 will become virtually invisible to the user.

According to one embodiment, if the user moves the pointer back toward the floating object 925, the floating object 925 will become less translucent as the pointer is moved closer to the displayed floating object. By making the floating object gradually more translucent as the pointer moves away from the floating object, a user is provided a visual representation that the importance of the functions displayed in the floating object are deemphasized relative to the present position of the pointer. That is, as the pointer is moved a distance away from the selected object 922, the need for the functionality displayed in the floating object 925 relative to that selected object is less important.

Figure 10:
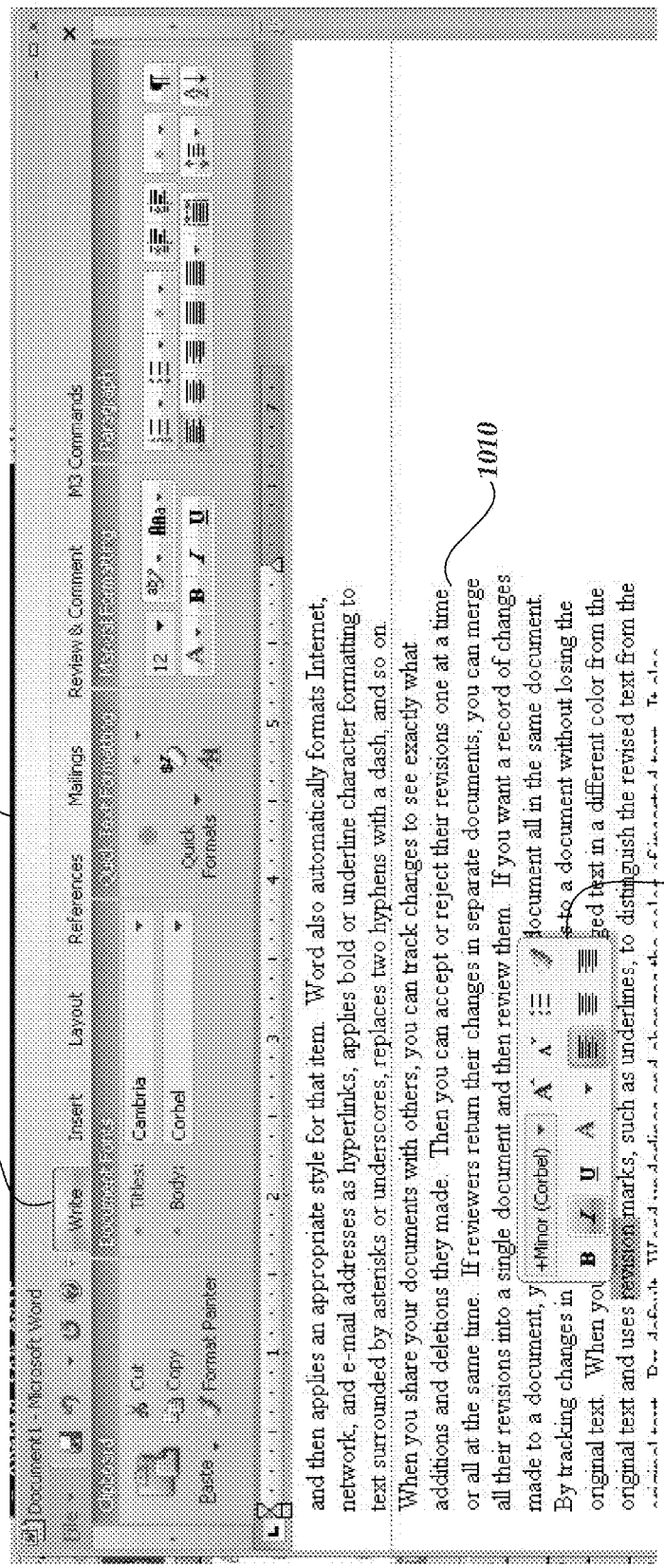
FIG. 10 illustrates an alternate layout of a floating object according to embodiments of the present invention.

Referring now to FIG. 10, an alternate visual layout of a floating command object 1025 is illustrated. As shown in FIG. 10, the alternate layout of the floating object 1025 includes two lines of buttons or controls for selecting one or more functionalities. As should be appreciated, many different layouts of buttons and controls and many different colors and object shapes may be used for the floating object and for visual properties of the floating object.

As described herein, a floating command object is provided for offering a set of commonly or frequently used commands in close proximity to a selected text, data or other object in a document. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

What is claimed is:

1. A method of providing a floating command object that is contextually relevant to selected document contents, the method comprising:
    displaying a command object adjacent to selected document content, the command object comprising at least one functionality command that is relevant to editing the selected document content;
    associating an opacity of the displayed command object to a distance between an electronic pointer and the displayed command object; and
    continuing to display the command object after receiving a selection of the at least one functionality command, wherein continuing to display the command object comprises maintaining the command object in its displayed position relative to the selected document content until additional document content is received.

2. The method of claim 1, further comprising:
    receiving a selection of the at least one functionality command; and
    editing the selected document content in association with the selected at least one functionality command.

3. The method of claim 2, wherein continuing to display the command object comprises editing the selected document content in association with the selected at least one functionality command without closing a display of the command object.

4. The method of claim 1, wherein continuing to display the command object comprises maintaining the command object in its displayed position relative to the selected text until the display of the command object is closed by a user action.

5. The method of claim 1, wherein maintaining the command object in its displayed position relative to the selected document contents until the display of the command object is closed by the user action comprises maintaining the command object until a selection of subsequent document content is received.

6. The method of claim 1, wherein displaying the command object adjacent to the selected document content comprises displaying the command object adjacent to an editing insertion point in the selected document content.

7. The method of claim 1, wherein associating the opacity of the displayed command object to the distance between an electronic pointer and the displayed command object comprises causing the displayed command object to grow increasingly translucent as the distance between the electronic pointer and the displayed command object increases.

8. The method of claim 1, wherein associating the opacity of the displayed command object to the distance between an electronic pointer and the displayed command object comprises causing the displayed command object to grow increasingly opaque as the distance between the electronic pointer and the displayed command object decreases.

9. The method of claim 1, further comprising, receiving, prior to displaying the command object, a selection of document text.

10. The method of claim 9, wherein displaying the command object comprising the at least one functionality command comprises displaying the at least one functionality command that is relevant to editing the selected text includes displaying, wherein selection of the at least one functionality command causes an application of a formatting property to the selected text.

11. A computer-readable medium having a set of instructions which when executed performs a method for providing a floating command object that is contextually relevant to selected document objects, the method executed by the set of instructions comprising:
    receiving a selection of document object for editing;
    displaying, in response to receiving the selection of the document object, a command object adjacent to the selected document object;
    displaying in the command object a set of functionality commands that are relevant to formatting the selected document object;
    associating an opacity of the displayed command object to a distance between an electronic pointer and the displayed command object; and
    continuing to display the command object throughout operation of any one of the set of functionality commands, wherein continuing to display the command object comprises maintaining the command object in its displayed position relative to the selected document object until additional document content is received.

12. The computer-readable medium of claim 11, further comprising:
    receiving a selection of a functionality command of the set of functionality commands; and
    applying functionality of the selected functionality command.

13. The computer-readable medium 12, wherein continuing to display the command object throughout operation of any one of the set of functionality commands comprises applying the functionality without closing a display of the command object after having applied the functionality.

14. The computer-readable medium of claim 11, wherein displaying in the command object the set of functionality commands that are relevant to formatting the selected document object comprises displaying the set of functionality commands derived from a subset of available formatting commands available for editing an electronic document associated with the document object.

15. The computer-readable medium of claim 14, wherein displaying the set of functionality commands derived from the subset of available formatting commands available for editing the electronic document associated with the document object comprises displaying the set of functionality commands with visual representations similar to those of the available formatting commands.

16. A system for providing a floating command object that is contextually relevant to selected document content, the system comprising:
- a memory storage;
- a processing unit coupled to the memory storage, wherein the processing unit is operative to:
    - receiving a selection of text for editing;
    - displaying, in response to receiving the selection of the text, a command object adjacent to the selected text;
    - displaying in the command object a set of functionality commands that are relevant to formatting properties associated with the selected text;
    - associating an opacity of the displayed command object to a distance between an electronic pointer and the displayed command object; and
    - continuing to display the command object throughout operation of any one of the set of functionality commands, wherein the processing unit being operative to continue to display the command object comprises the processing unit being operative to maintain the command object in its displayed position relative to the selected text until the display of the command object is closed by a user action and additional document content is received.

17. The system of claim 16, wherein the processing unit being operative to maintain the command object in its displayed position comprises the processing unit being operative to maintain the command object until a selection of subsequent document content is received.

* * * * *